United States Patent
Peloquin et al.

(10) Patent No.: US 11,708,685 B2
(45) Date of Patent: *Jul. 25, 2023

(54) TRACKED VEHICLE WITH ROTATING UPPER STRUCTURE AND PROCESSES THEREFOR

(71) Applicant: Prinoth Ltd., St. John (CA)

(72) Inventors: Stephane Peloquin, Saint-Hyacinthe (CA); Jonathan Thibault, Shefford (CA)

(73) Assignee: Prinoth Ltd., St. John (CA)

( * ) Notice: Subject to any disclaimer, the term of this patent is extended or adjusted under 35 U.S.C. 154(b) by 190 days.

This patent is subject to a terminal disclaimer.

(21) Appl. No.: 17/301,554

(22) Filed: Apr. 7, 2021

(65) Prior Publication Data

US 2021/0222398 A1   Jul. 22, 2021

Related U.S. Application Data

(63) Continuation of application No. 16/318,272, filed as application No. PCT/CA2017/050876 on Jul. 20, 2017, now Pat. No. 11,001,986.

(Continued)

(51) Int. Cl.
*E02F 9/12* (2006.01)
*B62D 55/06* (2006.01)
(Continued)

(52) U.S. Cl.
CPC ............... *E02F 9/123* (2013.01); *B60P 1/162* (2013.01); *B62D 55/06* (2013.01); *B60P 1/4471* (2013.01); *E02F 9/2037* (2013.01); *E02F 9/2253* (2013.01)

(58) Field of Classification Search
CPC ....... E02F 9/123; E02F 9/2037; E02F 9/2253; B62D 55/06; B60P 1/162; B60P 1/4471
See application file for complete search history.

(56) References Cited

U.S. PATENT DOCUMENTS

| | | |
|---|---|---|
| 4,183,711 A | 1/1980 | Schaeff |
| 4,433,495 A | 2/1984 | Kishi |

(Continued)

FOREIGN PATENT DOCUMENTS

| | | |
|---|---|---|
| CA | 2505458 A1 | 9/2006 |
| CA | 3031285 C | 4/2021 |

(Continued)

OTHER PUBLICATIONS

PCT, Intl. App. No. PCT/CA2017/050876 International Search Report, 3 pages, dated Aug. 16, 2017.

(Continued)

*Primary Examiner* — Tyler J Lee
(74) *Attorney, Agent, or Firm* — Woodard, Emhardt, Henry, Reeves & Wagner, LLP

(57) ABSTRACT

A process for execution by a processor of an electronic control unit (ECU), comprising: (a) detecting an operator command to align an upper structure of a tracked vehicle relative to a lower structure of the tracked vehicle; (b) in response to detection of the operator command, applying controlled rotation of the upper structure relative to the lower structure about an axis to align the upper structure relative to the lower structure at a predetermined relative angle; (c) in response to the upper structure having been aligned relative to the lower structure at the predetermined relative angle, signaling that alignment has been achieved; and (d) causing rotation of the upper structure to stop when alignment has been achieved and being non-responsive to further detection of the operator command during and for a predetermined period of time after said signaling. Also, a tracked vehicle comprising an ECU that executes the above process.

19 Claims, 15 Drawing Sheets

Related U.S. Application Data

(60) Provisional application No. 62/364,588, filed on Jul. 20, 2016.

(51) Int. Cl.
   *B60P 1/16* (2006.01)
   *E02F 9/20* (2006.01)
   *E02F 9/22* (2006.01)
   *B60P 1/44* (2006.01)

(56) References Cited

U.S. PATENT DOCUMENTS

| | | |
|---|---|---|
| 4,571,147 A | 2/1986 | Schaeff |
| 5,198,800 A | 3/1993 | Tozawa et al. |
| 5,373,909 A | 12/1994 | Dow et al. |
| 5,704,429 A | 1/1998 | Lee et al. |
| 5,711,095 A | 1/1998 | Oda et al. |
| 6,022,182 A | 2/2000 | Everett |
| 6,158,539 A | 12/2000 | Isley |
| 7,772,969 B2 | 8/2010 | Prohaska |
| 8,366,374 B2 | 2/2013 | Ishii |
| 9,206,588 B2 | 12/2015 | Wu et al. |
| 10,072,395 B2 * | 9/2018 | Tsukamoto ............ F16P 3/147 |
| 10,527,731 B2 * | 1/2020 | Kinoshita ............ G01S 17/931 |
| 10,876,273 B2 * | 12/2020 | Kozui ............ E02F 9/24 |
| 2005/0150142 A1 | 7/2005 | Matsuda et al. |
| 2008/0258889 A1 | 10/2008 | Prohaska |
| 2010/0264106 A1 * | 10/2010 | Kawai ............ B66C 23/94 |
| | | 212/276 |
| 2012/0271512 A1 | 10/2012 | Rupp et al. |
| 2013/0174556 A1 | 7/2013 | Nishikawa et al. |
| 2013/0222573 A1 * | 8/2013 | Onuma ............ G05B 9/02 |
| | | 348/82 |
| 2013/0245897 A1 | 9/2013 | Linstroth et al. |
| 2013/0345939 A1 | 12/2013 | Magaki et al. |
| 2014/0303855 A1 | 10/2014 | Umeda et al. |
| 2014/0354813 A1 * | 12/2014 | Ishimoto ............ E02F 9/261 |
| | | 348/148 |
| 2016/0237654 A1 | 8/2016 | Arimatsu et al. |
| 2016/0237655 A1 | 8/2016 | Baba et al. |
| 2016/0251834 A1 | 9/2016 | Arimatsu et al. |
| 2016/0251836 A1 | 9/2016 | Baba et al. |
| 2019/0242092 A1 | 8/2019 | Peloquin et al. |

FOREIGN PATENT DOCUMENTS

| | | |
|---|---|---|
| CN | 103502541 A | 1/2014 |
| CN | 105564518 A | 5/2016 |
| EP | 0423372 A1 | 4/1991 |
| EP | 1061187 A1 | 12/2000 |
| EP | 2716821 A1 | 4/2014 |
| JP | H02285114 A | 11/1990 |
| JP | H11269940 A | 10/1999 |
| JP | 2003138607 A | 5/2003 |
| WO | 2007022525 A2 | 2/2007 |
| WO | 2012161062 A1 | 11/2012 |
| WO | 2014182217 A1 | 11/2014 |
| WO | 2018014133 A1 | 1/2018 |

OTHER PUBLICATIONS

PCT, Intl. App. No. PCT/CA2017/050876 Written Opinion of the International Searching Authority, 6 pages, dated Aug. 16, 2017.
EPO, EP App. No. 17830156.0 Supplementary Search Report, 9 pages, dated Feb. 25, 2020.
Canadian Intellectual Property Office, CA App. No. 3031285 Examiner Report, 5 pages, dated Oct. 6, 2020.
PCT, Int. App. No. PCT/CA2017/050876 International Preliminary Report on Patentability dated Jan. 22, 2019, 7 pages, dated Jan. 22, 2019.
U.S. Appl. No. 16/318,272 Office Action dated Sep. 29, 2020, 18 pages, dated Jan. 22, 2019.
CN, Pat. App. No. 201780003402.9 Office Action dated Dec. 29, 2020, 3 pages, dated Dec. 29, 2020.
U.S. Appl. No. 16/318,272 Notice of Allowance dated Jan. 29, 2021, 10 pages, dated Jan. 29, 2021.
CA, Pat. App. No. 3031285 Notice of Allowance dated Mar. 10, 2021, 1 page, dated Mar. 10, 2021.
JP, Pat. App. No. 2019-502072 Office Action dated Jun. 14, 2021 with translation, 30 pages, dated Jun. 14, 2021.
CN, Pat. App. No. 201780003402.9 Office Action dated Sep. 6, 2021 translated, 18 pages, dated Sep. 6, 2021.
JP, Pat. App. No. 2019-502072 Notice of Allowance dated Jan. 28, 2022, 3 pages, dated Jan. 28, 2022.
CN, Pat. App. No. 201780003402.9 Office Action dated Apr. 18, 2022, 3 pages, dated Apr. 18, 2022.
CN, Pat. App. No. 201780003402.9 Notice of Allowance dated May 20, 2022, 2 pages, dated May 20, 2022.
JP, Pat. App. No. 2022-022405 Office Action dated Dec. 23, 2022, 3 pagemachine translation, 3 pages, dated Dec. 23, 2022.
EP, Pat. App. No. 17830156.0 Office Action dated Feb. 1, 2023, 4 pages, dated Feb. 1, 2023.

* cited by examiner

TRACKED VEHICLE WITH ROTATING UPPER STRUCTURE AND PROCESSES THEREFOR

CROSS-REFERENCE TO RELATED APPLICATIONS

This application is a continuation of U.S. patent application Ser. No. 16/318,272, filed Jan. 16, 2019, which is hereby incorporated by reference. U.S. patent application Ser. No. 16/318,272, filed Jan. 16, 2019, is a national stage of International Patent Application Number PCT/CA2017/050876, filed Jul. 20, 2017, which are hereby incorporated by reference. International Patent Application Number PCT/CA2017/050876, filed Jul. 20, 2017, claims the benefit of U.S. Patent Application No. 62/364,588, filed Jul. 20, 2016, which are hereby incorporated by reference.

FIELD

The present application relates generally to a tracked vehicle and, in particular, to a tracked vehicle with a rotatable upper structure and to processes used in controlling operation of such a tracked vehicle.

BACKGROUND

Tracked vehicles with rotatable upper structures are used in a variety of applications, such as construction, excavation or vegetation management, where rotation of the upper structure is used to transport material from source to destination while minimizing movement of the vehicle on the ground. Nevertheless, the vehicle must still be operable to travel with respect to the ground, and to this end the cabin has acceleration, braking and direction shifting functionality.

A problem may arise due to the fact that the cabin is located on the upper structure of the tracked vehicle, which rotates relative to the lower structure. Specifically, whereas the operator may place the engine into "drive" and may action the accelerator, the resulting motion of the vehicle as perceived by the operator will still further depend on the relative angle of rotation of the upper structure relative to the lower structure. Stated differently, the operator's demand for "forward" motion may result in either perceived forward or reverse movement of the vehicle, depending on the relative angle of rotation, which the operator may not have kept in mind since his or her attention may be focused on manipulating the work implement, etc. As a result, this uncertainty of the direction in which the tracked vehicle will move when auctioning the accelerator may lead to hesitation during operation, may require additional operator training and may lead to accidents.

SUMMARY

According to a first aspect, there is provided a process, comprising:
  detecting rotation of an upper structure of a tracked vehicle relative to a lower structure of the tracked vehicle about an axis;
  in response to the rotation resulting in a relative angular displacement in excess of a threshold angular displacement, signaling that a directionality switchover is available to be requested;
  in response to a directionality switchover request after the signaling, implementing a directionality switchover for the tracked vehicle.

According to a clause of the first aspect, the process further comprises generating the directionality switchover request.

According to a clause of the first aspect, the process is executed by a processor of an electronic control unit, wherein generating the directionality switchover request is executed by the processor without requiring input from an operator of the tracked vehicle.

According to a clause of the first aspect, the process is executed by a processor of an electronic control unit, wherein generating the directionality switchover request is executed by the processor in response to input from an operator of the tracked vehicle.

According to a clause of the first aspect, the process further comprises controlling track assemblies on opposite lateral sides of the tracked vehicle to cause movement of the tracked vehicle in response to demand from an operator for forward or reverse movement of the tracked vehicle;
  wherein prior to implementing the directionality switchover, the track assemblies are controlled to achieve movement of the tracked vehicle (i) in a first direction in response to operator demand for forward movement of the tracked vehicle; and (ii) in a second direction opposite the first direction in response to operator demand for reverse movement of the tracked vehicle;
  wherein to implement the directionality switchover, the process comprises controlling the track assemblies to achieve movement of the tracked vehicle (i) in the second direction in response to operator demand for forward movement of the tracked vehicle, and (ii) in the first direction in response to operator demand for reverse movement of the tracked vehicle.

According to a clause of the first aspect, the process further comprises detecting the directionality switchover request and wherein detecting the directionality switchover request comprises detecting that a certain control input has been actioned by an operator of the tracked vehicle.

According to a clause of the first aspect, wherein signaling that a directionality switchover is available to be requested comprises causing at least one of an audible alert and an optical alert to be issued through an output interface of the tracked vehicle.

According to a clause of the first aspect, signaling that a directionality switchover is available to be requested occurs only if at least a vehicle stability condition has also been met.

According to a clause of the first aspect, the vehicle stability condition comprises the tracked vehicle having zero speed in a plane of travel of the tracked vehicle.

According to a clause of the first aspect, the vehicle stability condition comprises the tracked vehicle having a speed of less than a predetermined maximum speed.

According to a clause of the first aspect, the vehicle stability condition comprises the tracked vehicle being geared in neutral or in park.

According to a clause of the first aspect, the vehicle stability condition comprises an accelerator of the tracked vehicle having been released and/or a brake of the tracked vehicle having been applied by the operator of the tracked vehicle.

According to a clause of the first aspect, the vehicle stability condition comprises the tracked vehicle being inclined by less than a predetermined maximum slope.

According to a clause of the first aspect, the axis is transverse to a plane of travel of the tracked vehicle.

According to a clause of the first aspect, the directionality switchover for the tracked vehicle is implemented in response to the directionality switchover request after the signaling only if at least a vehicle stability condition has also been met.

According to a clause of the first aspect, if the directionality switchover request occurs after the signaling without the vehicle stability condition having been met, the process further comprises signaling non-implementation of a directionality switchover.

According to a clause of the first aspect, signaling non-implementation of a directionality switchover comprises causing issuance of at least one of an audible alert and an optical alert to an operator of the tracked vehicle through an output interface of the tracked vehicle.

According to a clause of the first aspect, the process further comprises causing at least one of an audible alert and an optical alert to be issued through an output interface of the tracked vehicle when the vehicle stability condition has been met.

According to a clause of the first aspect, signaling to an operator of the tracked vehicle that a directionality switchover is available to be requested comprises causing at least one of a further audible alert and a further optical alert to be issued through the output interface of the tracked vehicle.

According to a clause of the first aspect, the directionality switchover for the tracked vehicle is implemented in response to the directionality switchover request after the signaling only if at least a vehicle operating condition has also been met.

According to a clause of the first aspect, the vehicle operating condition comprises a work implement activation lever being unlocked.

According to a clause of the first aspect, the threshold angular displacement is about 90 degrees.

According to a clause of the first aspect, the process further comprises:
  in response to the rotation resulting in a relative angular displacement in excess of a second threshold angular displacement without occurrence of a directionality switchover request after the signaling, ceasing to signal that a directionality switchover is available to be requested.

According to a clause of the first aspect, the process further comprises, in response to detecting a directionality switchover request after the ceasing to signal, not implementing a directionality switchover for the tracked vehicle.

According to a clause of the first aspect, wherein the difference between the second and first threshold angular displacements is about 180 degrees.

According to a clause of the first aspect, the directionality switchover is a first directionality switchover, and the process further comprises, after implementing the first directionality switchover:
  in response to the rotation resulting in a relative angular displacement in excess of a second threshold angular displacement, second signaling that a directionality switchover is available to be requested; and
  in response to detecting a directionality switchover request after the second signaling, implementing a second directionality switchover for the tracked vehicle.

According to a clause of the first aspect, the process further comprises, after implementing the first directionality switchover, setting the second threshold angular displacement to 180 degrees offset from the first threshold angular displacement.

According to a clause of the first aspect, the process further comprises:
  controlling track assemblies on opposite lateral sides of the tracked vehicle to cause movement of the tracked vehicle in response to demand from an operator for forward or reverse movement of the tracked vehicle,
  wherein prior to implementing the first directionality switchover, the track assemblies are controlled to achieve movement of the tracked vehicle (i) in a first direction in response to operator demand for forward movement of the tracked vehicle; and (ii) in a second direction opposite the first direction in response to operator demand for reverse movement of the tracked vehicle;
  wherein to implement the second directionality switchover, the process comprises controlling the track assemblies to achieve movement of the tracked vehicle (i) in the first direction in response to operator demand for forward movement of the tracked vehicle, and (ii) in the second direction in response to operator demand for reverse movement of the tracked vehicle.

According to a clause of the first aspect, the process further comprises recording the number of directionality switchovers implemented since production of the tracked vehicle.

According to a clause of the first aspect, the process further comprises implementing multiple sequential directionality switchovers, wherein every second directionality switchover represents a return to a factory setting, wherein every intervening directionality switchover represents a directionality setting opposite to the factory setting, and wherein the process further comprises keeping track of whether or not a current directionality setting of the tracked vehicle is the factory setting.

According to a clause of the first aspect, the process further comprises causing issuance of a signal to indicate whether or not the current directionality setting of the tracked vehicle is the factory setting.

According to a clause of the first aspect, the process further comprises detecting failure to detect rotation of the upper structure of the tracked vehicle relative to the lower structure of the tracked vehicle about the axis and causing issuance of a signal to indicate occurrence of the detection failure.

According to a clause of the first aspect, responsive to detection of the failure to detect, the process further comprises causing issuance of a signal to alert the operator of the tracked vehicle that a directionality switchover is not available to be requested.

According to a second aspect, there is provided a tracked vehicle, which comprises:
  a body comprising a lower structure and an upper structure rotatable relative to the lower structure about an axis;
  an angle sensor for detecting rotation of the upper structure relative to the lower structure about the axis;
  first and second track assemblies mounted, respectively, on opposite lateral sides of the body;
  a prime mover;
  an electronic control unit;
  a transmission for controllably transferring power from the prime mover to the track assemblies based on an output of the electronic control unit;

the electronic control unit configured for responding to the angle sensor having detected a relative angular displacement in excess of a threshold angular displacement by:
- causing a signal to be emitted via an output interface to indicate that a directionality switchover is available to be requested; and
- in response to detecting a directionality switchover request after the causing, causing the transmission to implement a directionality switchover for the tracked vehicle.

According to a clause of the second aspect, wherein prior to implementing the directionality switchover, the transmission is configured to control the track assemblies to achieve movement of the tracked vehicle (i) in a first direction in response to operator demand for forward movement of the tracked vehicle; and (ii) in a second direction opposite the first direction in response to operator demand for reverse movement of the tracked vehicle, and wherein to implement the directionality switchover, the transmission is configured to control the track assemblies to achieve movement of the tracked vehicle (i) in the second direction in response to operator demand for forward movement of the tracked vehicle, and (ii) in the first direction in response to operator demand for reverse movement of the tracked vehicle.

According to a clause of the second aspect, the sensor is a first sensor, and the tracked vehicle further comprises a second sensor for detecting rotation of the upper structure relative to the lower structure about the axis, wherein the electronic control unit being configured for responding to the sensor having detected a relative angular displacement in excess of the threshold angular displacement comprises the electronic control unit being configured for responding to a combination of the first sensor and the second sensor having detected a relative angular displacement in excess of the threshold angular displacement.

According to a clause of the second aspect, the combination is an average.

According to a clause of the second aspect, the sensor is a first sensor, and the tracked vehicle further comprises a second sensor for detecting rotation of the upper structure relative to the lower structure about the axis, wherein the electronic control unit being configured for responding to the sensor having detected a relative angular displacement in excess of the threshold angular displacement comprises the electronic control unit being configured for responding to the first sensor if the second sensor has failed and vice versa.

According to a clause of the second aspect, the engine control unit is configured to determine failure of the first sensor or the second sensor by comparing an output of the first sensor to an output of the second sensor during rotation of the upper structure relative to the lower structure.

According to a clause of the second aspect, the tracked vehicle further comprises an input capable of being activated by the operator of the tracked vehicle to enter the directionality switchover request.

According to a clause of the second aspect, the output interface further comprises an output device configured to emit an audible or optical signal to indicate to the operator of the tracked vehicle that a directionality switchover is available to be requested.

According to a clause of the second aspect, the electronic control unit is configured for detecting if at least a vehicle stability condition has been met and causing the signal to be emitted only if the vehicle stability condition has also been met.

According to a clause of the second aspect, the tracked vehicle further comprises a speedometer and wherein the electronic control unit is configured for causing the signal to be emitted only if an output of the speedometer indicates that the tracked vehicle is not moving faster than a predetermined maximum speed.

According to a clause of the second aspect, the electronic control unit is configured for causing the signal to be emitted only if the tracked vehicle is geared in neutral or in park.

According to a clause of the second aspect, the electronic control unit is configured for causing the signal to be emitted only if the speed control mechanism indicates that the operator of the tracked vehicle has not made a demand for forward or reverse movement of the tracked vehicle.

According to a clause of the second aspect, the tracked vehicle further comprises an inclinometer and wherein the electronic control unit is configured for causing the signal to be emitted only if an output of the inclinometer indicates that the tracked vehicle is inclined by less than a predetermined maximum slope.

According to a clause of the second aspect, the transmission is caused to implement the directionality switchover for the tracked vehicle in response to detecting the directionality switchover request after the causing only if at least a vehicle stability condition has also been met.

According to a clause of the second aspect, the output interface comprises a first output device configured to emit the signal to indicate to the operator of the tracked vehicle that a directionality switchover is available to be requested, and a second output device configured to emit a second signal to indicate non-implementation of a directionality switchover if the directionality switchover request is detected after emission of the first signal without the vehicle stability condition having been met.

According to a clause of the second aspect, the first and second output devices comprise illuminated dashboard visual effects.

According to a clause of the second aspect, wherein the electronic control unit is configured for detecting if at least a vehicle operating condition has been met and causing the signal to be emitted only if the vehicle operating condition has also been met.

According to a clause of the second aspect, the tracked vehicle further comprises a work implement activation lever and wherein the vehicle operating condition comprises the work implement activation lever being unlocked.

According to a clause of the second aspect, the threshold angular displacement is about 90 degrees.

According to a clause of the second aspect, in response to the rotation resulting in a relative angular displacement in excess of a second threshold angular displacement without yet having detected a directionality switchover request after the signaling, the electronic control unit is configured to cease causing the signal to be emitted.

According to a clause of the second aspect, in response to the electronic control unit detecting a directionality switchover request after the first signal has ceased to be emitted, the transmission is configured to not implement a directionality switchover for the tracked vehicle.

According to a clause of the second aspect, the difference between the second and first threshold angular displacements is about 180 degrees.

According to a clause of the second aspect, the electronic control unit is configured to detect a failure of the sensor to detect rotation of the upper structure of the tracked vehicle relative to the lower structure of the tracked vehicle about the axis, the electronic control unit being further configured to cause issuance of a signal via an output device to indicate occurrence of the failure.

According to a clause of the second aspect, the electronic control unit is further configured to respond to the failure to alert the operator of the tracked vehicle that a directionality switchover is not available to be requested.

Additionally, there is provided a computer-readable storage medium that comprises computer-readable storage instructions which, when executed by a processor, cause the processor to carry out a process as defined in the second aspect.

According to a third aspect, there is provided a method, which comprises:
   detecting rotation of an upper structure of a tracked vehicle relative to a lower structure of the tracked vehicle about an axis;
   in response to (i) the rotation resulting in a relative angular displacement in excess of a threshold angular displacement and (ii) receipt of an operator-initiated directionality switchover request, implementing a directionality switchover for the tracked vehicle.

According to a fourth aspect, there is provided a tracked vehicle, which comprises:
   a body comprising a lower structure and an upper structure rotatable relative to the lower structure about an axis;
   an angle sensor for detecting rotation of the upper structure relative to the lower structure about the axis;
   first and second track assemblies mounted, respectively, on opposite lateral sides of the body;
   a prime mover;
   an electronic control unit;
   a transmission for controlling directionality of the track assemblies based on an output of the electronic control unit;
   the electronic control unit configured for responding to the angle sensor having detected a relative angular displacement in excess of a threshold angular displacement by implementing a directionality switchover for the tracked vehicle in response to an operator-initiated directionality switchover request.

Additionally, there is provided a computer-readable storage medium that comprises computer-readable storage instructions which, when executed by a processor, cause the processor to carry out a method as defined in the third aspect.

According to a fifth aspect, there is provided a process, which comprises:
   detecting an operator command to align an upper structure of a tracked vehicle relative to a lower structure of the tracked vehicle;
   in response to detection of the operator command, applying controlled rotation of the upper structure relative to the lower structure about an axis to align the upper structure relative to the lower structure at a predetermined relative angle.

According to a clause of the fifth aspect, the command is a first command, the process further comprising detecting a second operator command to rotate the upper structure relative to the lower structure of the tracked vehicle about the axis.

According to a clause of the fifth aspect, the process is executed by a processor of an electronic control unit, and the process further comprises consulting a memory of the electronic control unit to obtain the predetermined relative angle.

According to a clause of the fifth aspect, the predetermined relative angle is selected from a first angle and a second angle, the process further comprising detecting a current relative angle between the upper and lower structures, and selecting the predetermined relative angle to be the first angle or the second angle as a function of the current relative angle.

According to a clause of the fifth aspect, the first and second angles are 180 degrees apart.

According to a clause of the fifth aspect, the process further comprises, prior to detecting the operator command, receiving from an operator of the tracked vehicle an indication of the predetermined relative angle and storing the predetermined relative angle in a memory.

According to a clause of the fifth aspect, the process further comprises, in response to the upper structure having been aligned relative to the lower structure at the predetermined relative angle, signaling that alignment has been achieved.

According to a clause of the fifth aspect, the process further comprises causing issuance of at least one of an audible alert and an optical alert in response to the detection of the operator command.

According to a clause of the fifth aspect, the signaling that alignment has been achieved comprises ceasing to issue the at least one of an audible alert and an optical alert.

According to a clause of the fifth aspect, signaling that alignment has been achieved comprises reducing an angular velocity of the upper structure to a minimum when alignment has been achieved.

According to a clause of the fifth aspect, signaling that alignment has been achieved comprises temporarily stopping rotation of the upper structure when alignment has been achieved.

According to a clause of the fifth aspect, the process further comprises stopping rotation of the upper structure when alignment has been achieved and being non-responsive to further detection of the operator command during and a certain period of time after the signaling.

According to a clause of the fifth aspect, the operator command is a first operator command, the process further comprising detecting a second operator command to rotate the upper structure relative to the lower structure about the axis, and wherein the period of time expires once the second operator command has been applied persistently for a certain period of time following alignment.

According to a clause of the fifth aspect, signaling that alignment has been achieved comprises issuing at least one of an audible alert and an optical alert to an operator of the tracked vehicle when alignment has been achieved.

According to a clause of the fifth aspect, if the operator command continues to be received during and immediately after the signaling, rotation of the upper structure relative to the lower structure is continued after the signaling, such that the upper structure is no longer aligned relative to the lower structure at the predetermined relative angle.

According to a clause of the fifth aspect, the operator command is a first operator command, the process further comprising detecting a second operator command to rotate the upper structure relative to the lower structure about the axis, and wherein detecting the second operator command comprises detecting that an operator of the tracked vehicle has applied and continues to apply at least a certain force to a first input control of the tracked vehicle.

According to a clause of the fifth aspect, detecting the first operator command comprises detecting that the operator of the tracked vehicle has applied and continues to apply at least a certain force to a second input control of the tracked vehicle.

According to a clause of the fifth aspect, detecting the first operator command comprises detecting that the operator of the tracked vehicle has applied and continues to apply at least a certain force to a second input control of the tracked vehicle while applying at least the certain force to the first input control of the tracked vehicle.

According to a clause of the fifth aspect, detecting the first operator command comprises detecting that the operator of the tracked vehicle has recently applied at least a certain force to a second input control of the tracked vehicle, wherein the controlled rotation of the upper structure relative to the lower structure about the axis to align the upper structure relative to the lower structure at the predetermined relative angle is autonomous.

According to a clause of the fifth aspect, detecting the first operator command comprises detecting that the operator of the tracked vehicle has recently applied at least a certain force to a second input control of the tracked vehicle while applying at least the certain force to the first input control of the tracked vehicle, wherein the controlled rotation of the upper structure relative to the lower structure about the axis to align the upper structure relative to the lower structure at the predetermined relative angle occurs only if at least the certain force continues to be applied to the first input control of the tracked vehicle.

According to a clause of the fifth aspect, applying controlled rotation of the upper structure relative to the lower structure about the axis to align the upper structure relative to the lower structure at the predetermined relative angle comprises autonomously rotating the upper structure relative to the lower structure about the axis to align the upper structure relative to the lower structure at the predetermined relative angle.

According to a clause of the fifth aspect, applying controlled rotation of the upper structure relative to the lower structure about the axis to align the upper structure relative to the lower structure at the predetermined relative angle comprises limiting angular displacement of the upper structure relative to the lower structure about the axis in accordance with an angular displacement limit curve.

According to a clause of the fifth aspect, the angular displacement limit curve indicates a maximum rate of angular displacement as a function of angular distance relative to the predetermined relative angle.

According to a clause of the fifth aspect, the process is executed by a processor, and further comprises consulting a memory to obtain the angular displacement limit curve.

According to a clause of the fifth aspect, the process further comprises ceasing to limit the angular displacement in response to detection of non-application of the operator command.

According to a clause of the fifth aspect, the command is a first operator command, the process further comprising detecting a second operator command to rotate the upper structure relative to the lower structure about the axis, and wherein detecting the second operator command comprises detecting that the operator of the tracked vehicle has applied and continues to apply at least a certain force to a first input control of the tracked vehicle.

According to a clause of the fifth aspect, detecting the first operator command comprises detecting that the operator of the tracked vehicle has applied and continues to apply at least a certain force to a second input control of the tracked vehicle, and wherein detection of non-application of the first operator command comprises detecting that the operator does not apply at least the certain force to the second input control of the tracked vehicle.

According to a clause of the fifth aspect, detecting the first operator command comprises detecting that the operator of the tracked vehicle has applied and continues to apply at least a certain force to a second input control of the tracked vehicle while applying at least the certain force to the first input control of the tracked vehicle, and wherein detection of non-application of the first operator command comprises detecting that the operator does not apply at least the certain force to the second input control of the tracked vehicle or that the operator does not apply at least the certain force to the first input control of the tracked vehicle.

According to a clause of the fifth aspect, detecting the first operator command comprises detecting that the operator of the tracked vehicle has recently applied at least a certain force to a second input control of the tracked vehicle, wherein the controlled rotation of the upper structure relative to the lower structure about the axis to align the upper structure relative to the lower structure at the predetermined relative angle is autonomous.

According to a clause of the fifth aspect, the command is a first operator command, the process further comprising detecting a second operator command to rotate the upper structure relative to the lower structure about the axis, further comprising interrupting rotation of the upper structure relative to the lower structure about the axis in response to detection of non-application of the second operator command.

According to a clause of the fifth aspect, detecting the second operator command comprises detecting that the operator of the tracked vehicle has applied and continues to apply at least a certain force to a first input control of the tracked vehicle, and wherein detection of non-application of the second operator command comprises detecting that the operator does not apply at least the certain force to the first input control of the tracked vehicle.

According to a clause of the fifth aspect, detecting the first operator command comprises detecting that the operator of the tracked vehicle has applied and continues to apply at least a certain force to a second input control of the tracked vehicle.

According to a clause of the fifth aspect, detecting the first operator command comprises detecting that the operator of the tracked vehicle has applied and continues to apply at least a certain force to a second input control of the tracked vehicle while applying at least the certain force to the first input control of the tracked vehicle.

According to a clause of the fifth aspect, detecting the first operator command comprises detecting that the operator of the tracked vehicle has recently applied at least a certain force to a second input control of the tracked vehicle, wherein the controlled rotation of the upper structure relative to the lower structure about the axis to align the upper structure relative to the lower structure at the predetermined relative angle is autonomous.

According to a clause of the fifth aspect, detecting the first operator command comprises detecting that the operator of the tracked vehicle has recently applied at least a certain force to a second input control of the tracked vehicle while applying at least the certain force to the first input control of the tracked vehicle, wherein the controlled rotation of the upper structure relative to the lower structure about the axis to align the upper structure relative to the lower structure at the predetermined relative angle occurs only if at least the certain force continues to be applied to the first input control of the tracked vehicle.

According to a clause of the fifth aspect, the axis is transverse to a plane of travel of the tracked vehicle.

According to a clause of the fifth aspect, after alignment is achieved, the tracked vehicle is allowed to travel in a forward or reverse direction along the plane of travel.

According to a clause of the fifth aspect, before and during at least part of the controlled rotation, the tracked vehicle is prevented from traveling in a forward or reverse direction along the plane of travel.

According to a sixth aspect, there is provided a tracked vehicle, which comprises:
a body comprising a lower structure and an upper structure rotatable relative to the lower structure about an axis;
a motor for rotating the upper structure relative to the lower structure;
first and second track assemblies mounted on, respectively, opposite lateral sides of the body;
an operator interface for allowing an operator of the tracked vehicle to enter operator commands;
an electronic control unit configured for:
detecting an operator command to align the upper structure relative to the lower structure;
in response to detection of the operator command, controlling operation of the motor so as to align the upper structure relative to the lower structure at a predetermined relative angle.

According to a clause of the sixth aspect, the tracked vehicle further comprises a sensor for detecting rotation of the upper structure relative to the lower structure about the axis, the electronic control unit being configured to control operation of the motor based on an output of the sensor.

According to a clause of the sixth aspect, the command is a first command, wherein the electronic control unit is further configured for detecting a second operator command to rotate the upper structure relative to the lower structure.

Additionally, there is provided a computer-readable storage medium that comprises computer-readable storage instructions which, when executed by a processor, cause the processor to carry out a process as defined in the sixth aspect.

According to a seventh aspect, there is provided a tracked vehicle, which comprises:
a body comprising a lower structure and an upper structure rotatable relative to the lower structure about an axis;
a motor for rotating the upper structure relative to the lower structure;
first and second track assemblies mounted on, respectively, opposite lateral sides of the body;
an inclinometer configured for detecting a slope of the tracked vehicle and outputting a signal indicative of the slope; and
an electronic control unit configured for limiting a speed of rotation of the upper structure relative to the lower structure as a function of the output from the inclinometer.

DETAILED DESCRIPTION OF EMBODIMENTS

Figure 1A:
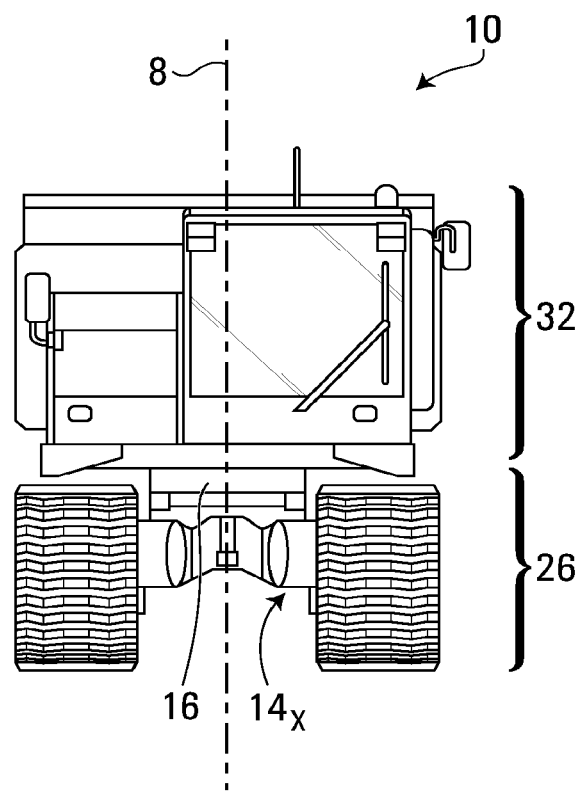
FIGS. 1A and 1B are, respectively, front and side elevation views of a tracked vehicle having an upper structure and a lower structure, in accordance with an example non-limiting embodiment.
Figure 1B:
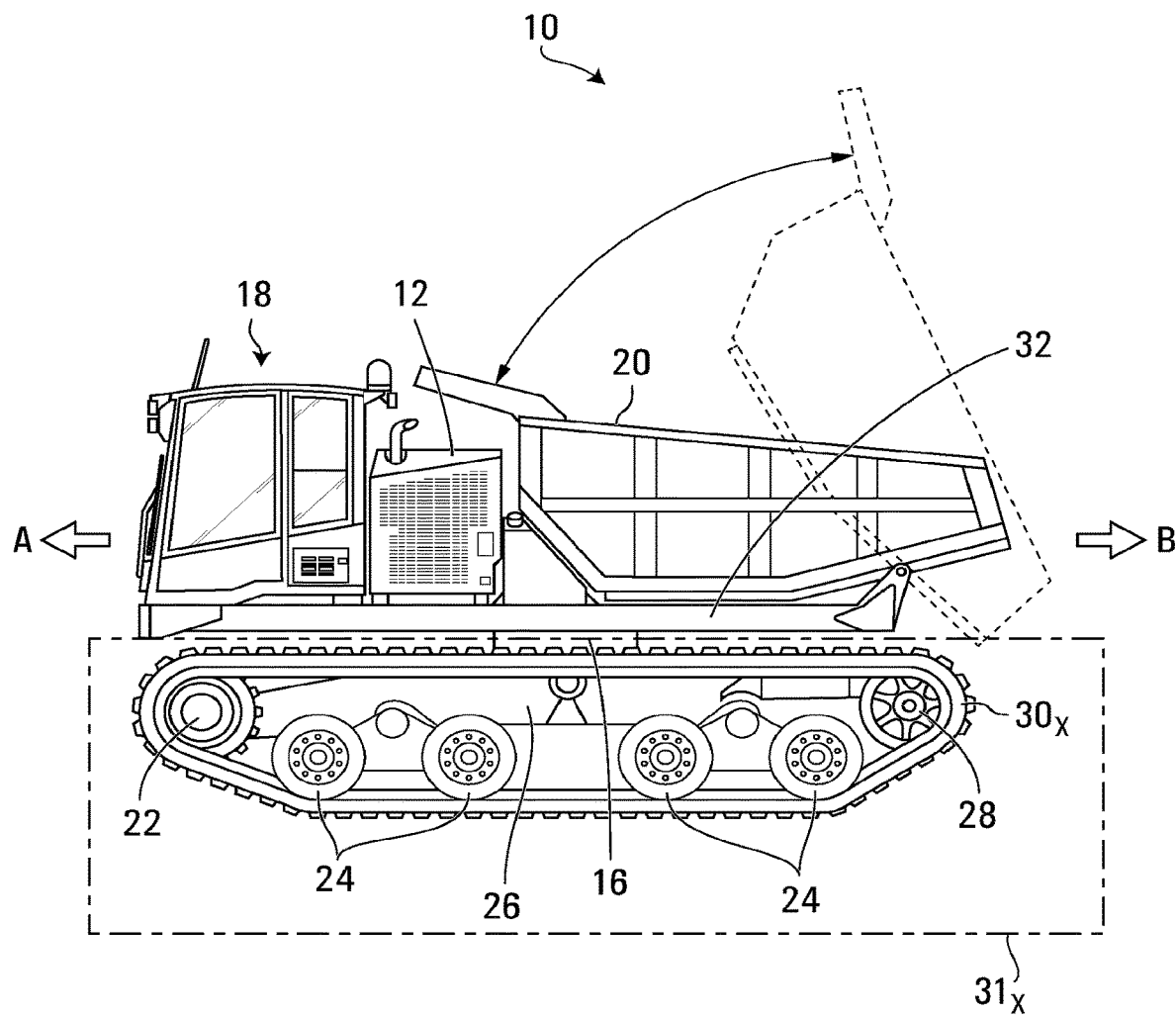
Figure 1C:
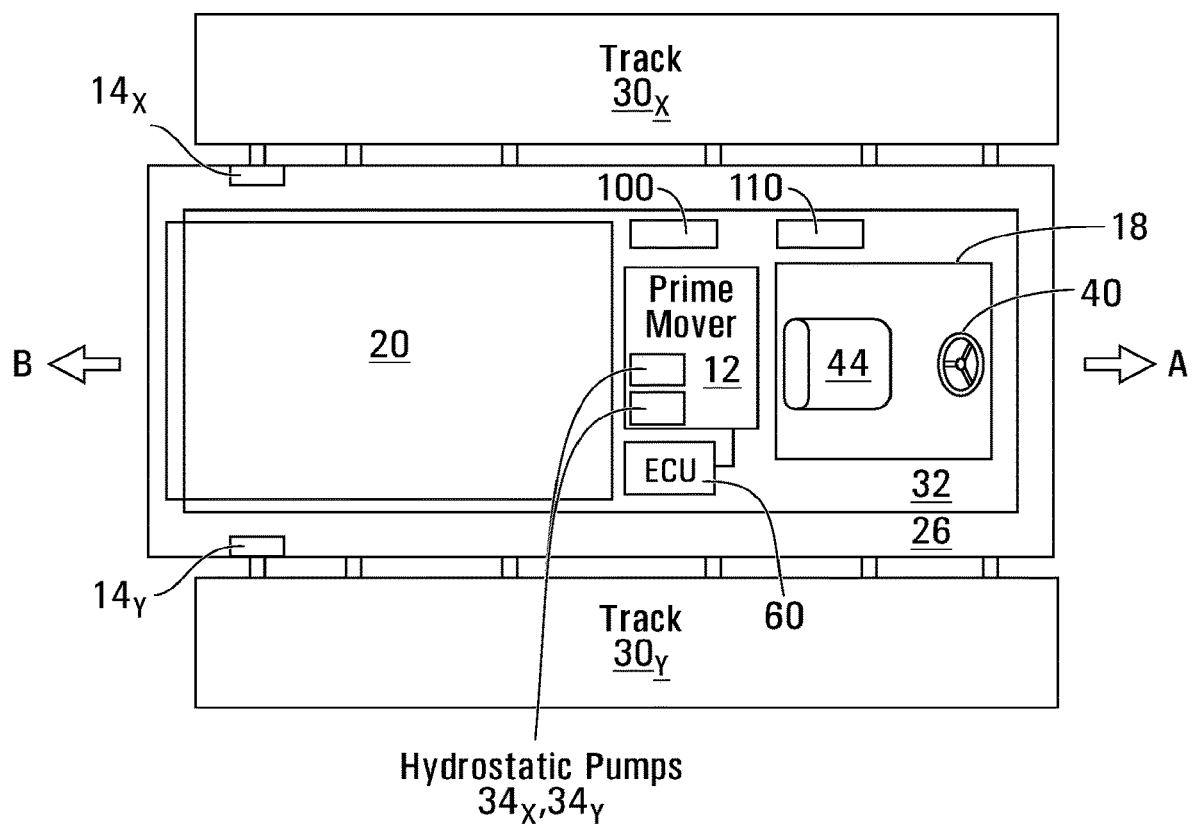
FIG. 1C is a schematic top view of the tracked vehicle of FIGS. 1A and 1B.

With reference to FIGS. 1A, 1B, 1C and 1D, there is shown a tracked vehicle 10 in accordance with a non-limiting embodiment of the present invention. The tracked vehicle 10 includes a body with a lower structure 26 and an upper structure 32 rotatable relative to the lower structure 26 about an axis 8. A vertical channel 16 with a bearing extends between the upper structure 32 and the lower structure 26 and may allow the passage of, among other things, electrical cables and pipes containing hydrostatic oil and, optionally, a thermometer. A variety of bearing types may be used to permit rotation of the upper structure 32 relative to the lower structure 26, including but not limited to a slew bearing. An operator cabin 18 is mounted to the upper structure 32 and moves together with the upper structure 32 when the upper structure 32 undergoes an angular displacement from an initial angular position. A motor 100 is configured to controllably rotate the upper structure 32 relative to the lower structure 26, based on an output from an engine control unit (ECU) 60. The motor 100 can be anchored to the upper structure 32 and may engage the lower structure 26, or the motor 100 can be anchored to the lower structure 26 and may engage the upper structure 32; in either case, relative motion of the upper and lower structures is achieved as a result of a force applied by the motor 100.

In the present embodiment, two track assemblies 31X, 31Y are mounted to the body, specifically there is one track assembly on each of the two opposite lateral sides of the lower structure 26. In other embodiments, there may be more than two track assemblies. A particular track assembly (e.g., track assembly 30X) may include a drive wheel 22, an idler wheel 28 and one or more support wheels 24, surrounded by an endless track 30X. The tracks may be any suitable tracks, such as rubber tracks including but not limited to metal embedded rubber tracks (MERT). In the illustrated embodiment, the tracks are denoted X and Y.

Figure 15:
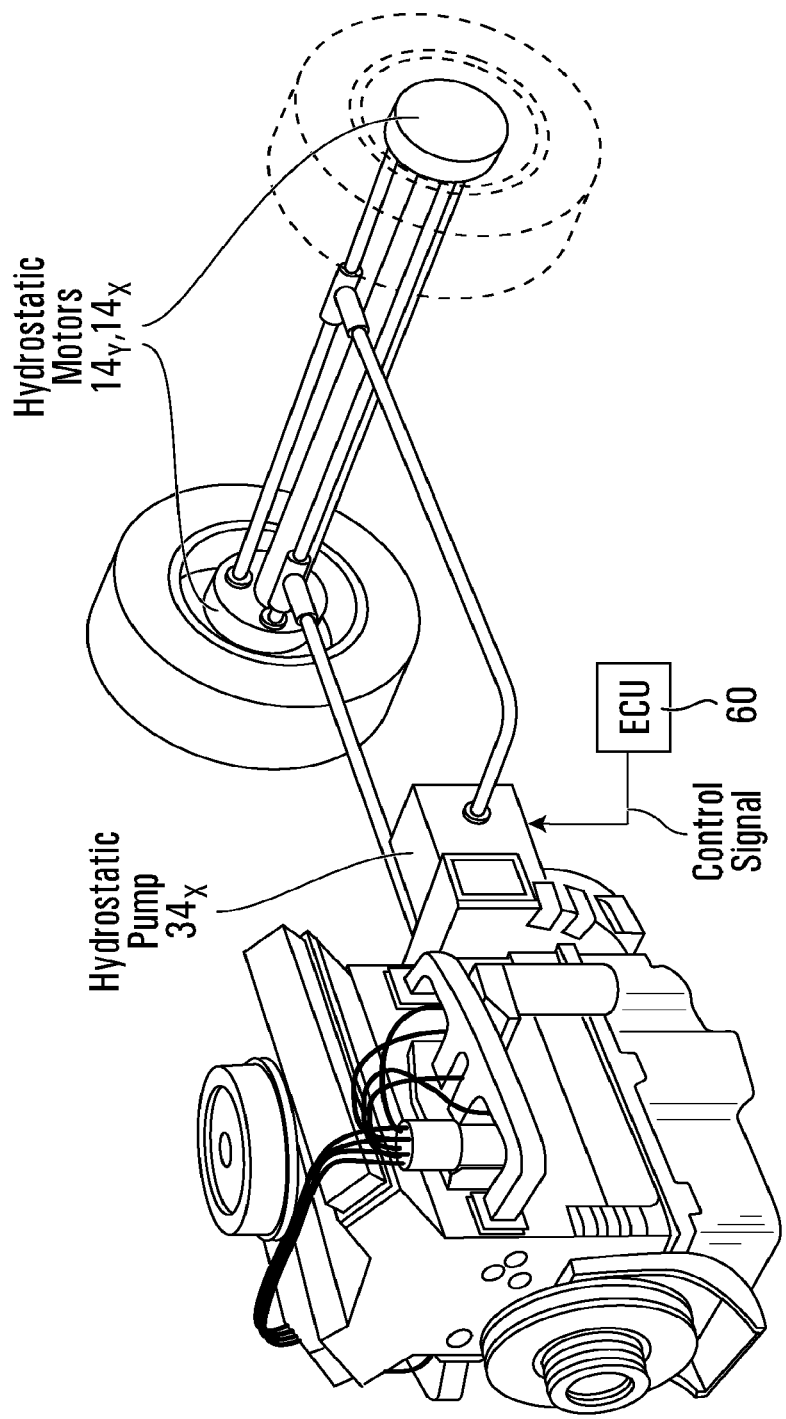
FIG. 15 is a perspective view of a transmission including hydrostatic motors, a hydrostatic pump and an ECU.
Figure 16:
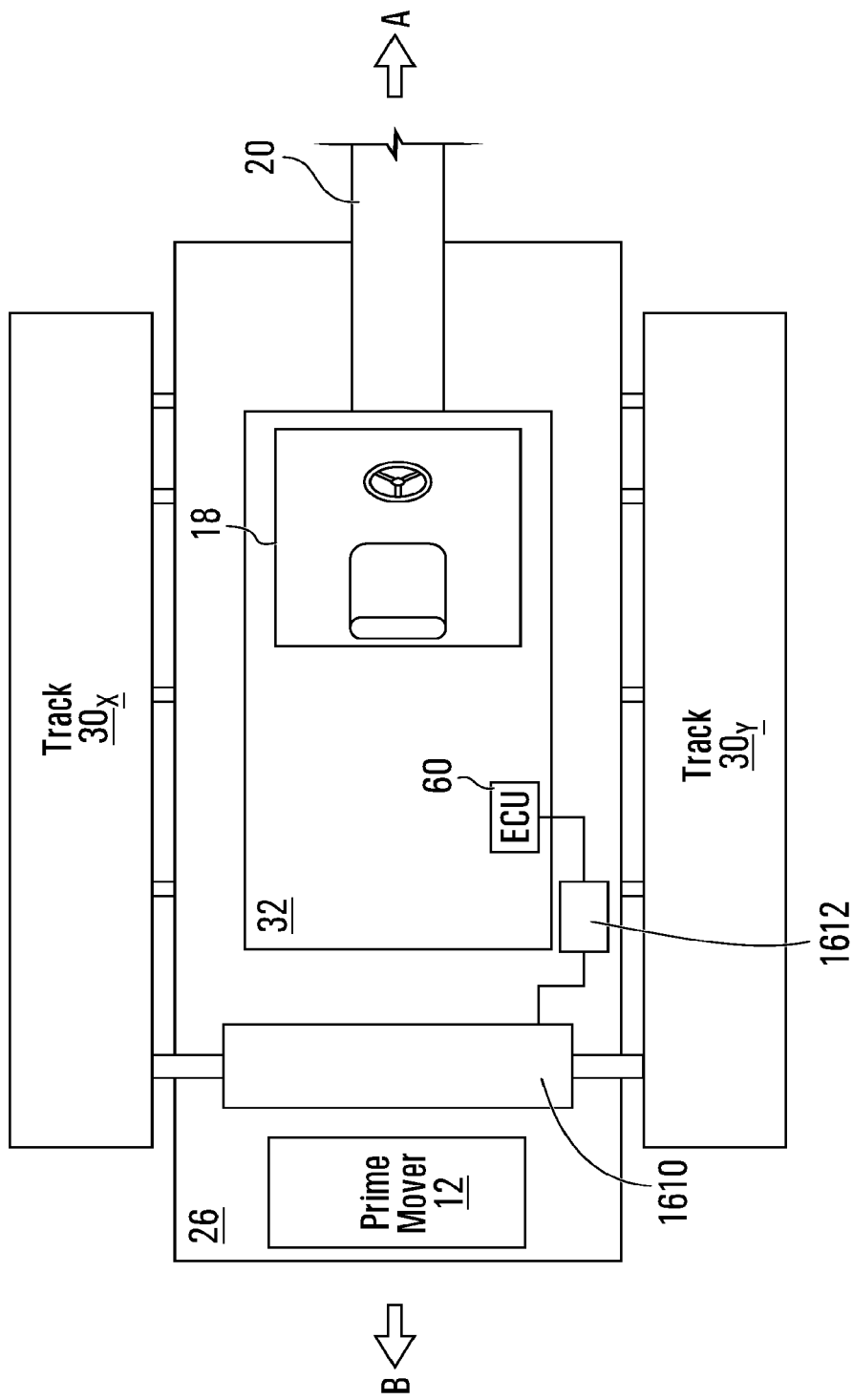
FIG. 16 is a schematic diagram of an embodiment of the tracked vehicle with an upper structure and a lower structure in which the prime mover is mounted to the lower structure.

A prime mover 12 is mounted to the body. In the illustrated embodiment of FIGS. 1A, 1B and 1C, the prime mover 12 is mounted to the upper structure 32. However, this does not preclude mounting of the prime mover to the lower structure 26, as shown in FIG. 16. The prime mover 12 may be an engine, such as an internal combustion (e.g., diesel or gasoline) engine or an electrically powered hydraulic motor, to name a few non-limiting possibilities. A transmission 1610 transfers power from the prime mover 12 to the track assemblies 31X, 31Y, e.g., to the drive wheel 22 of each of the track assemblies. In an embodiment, the transmission 1610 may be a hydrostatic transmission, as illustrated in FIG. 15. In particular, the hydrostatic transmission includes one or more hydrostatic pumps 34X coupled to the prime mover 12. The hydrostatic pump 34X delivers a controllable amount of hydrostatic oil flow to a hydrostatic motor 14X that is mounted to one of the drive wheels 22. There may be two hydrostatic pumps that independently feed respective hydrostatic motors 14X, 14Y so as to provide independent control of the motion of the tracks 30X and 30Y. Each of the hydrostatic pumps is configured to regulate the amount of power that is transmitted to its corresponding track assembly 31X, 31Y, as well as the direction of rotation of the corresponding drive wheel 22, in accordance with a respective control signal received from the ECU 60. In another embodiment, conceptually shown in FIG. 16, the transmission 1610 may include a transmission control 1612 that is intermediate the prime mover 12 and the drive wheels 22, and is also fed by control signals from the ECU 60.

Each of the drive wheels 22 may turn in each of two opposite directions (clockwise and counter-clockwise when viewed head-on externally from the tracked vehicle 10), thus causing the corresponding endless track 30X, 30Y to move, thereby propelling the tracked vehicle 10 in a variety of possible directions of travel in a so-called "plane of travel". Two such directions are opposite one another and are aligned lengthwise with the lower structure 26. While it may be possible to refer to these two opposite directions of travel as "forward" and "reverse", these terms may lose their significance due to the symmetry with which the track assemblies may be controlled and due to the upper structure 32 (and the operator cabin 18) being rotatable relative to the lower structure 26 (to which the track assemblies 31X, 31Y are attached). As such, the two opposite directions in which the tracked vehicle 10 may travel when the same amount of power (in matching rotational directions) is applied to both track assemblies 31X, 31Y by the transmission 1610 are referred to as "A" and "B" (shown in the drawing). By causing the amount of applied power between the two track assemblies to differ, the lower structure 26 can be made to turn about a central axis that is transverse to the plane of travel, as would occur during a steering operation. It is noted that the axis about which the upper and lower structures 32, 26 are rotatable relative to one another may in general also be transverse to the plane of travel of the tracked vehicle and may, but need not, correspond to the aforementioned central axis.

Additionally, in some embodiments, a work implement 20 may be mounted to the upper structure 32. In one example application (illustrated in FIGS. 1A, 1B and 1C), the work implement 20 may include a dump box mounted on the upper structure 32 behind the operator cabin 18 in the lengthwise direction of the tracked vehicle 10. The dump box may controllably pivot along a transverse axis (or more than one axis) to effectively unload its contents behind the tracked vehicle 10. In other example applications, the work implement 20 may be an excavator shovel/bucket, oil rig, crane, etc., and/or may be mounted in front of the operator cabin 18. Operation of the work implement 20 may be controlled by signals transmitted from the ECU 60, which receives instructions entered by an operator of the tracked vehicle 10 at a work implement control center 48.

The operator cabin 18 may seat the operator and, in some cases, may also seat one or more passengers. The operator cabin 18 includes various control inputs for allowing the operator to control movement and operation of the tracked vehicle 10 and the work implement 12. Specifically, the control inputs may include a shifter 50 through which the operator may enter a chosen relative direction (forward/drive, reverse) of the tracked vehicle 10. The control inputs may further include an accelerator 52 (e.g., pedal, joystick, lever or other device) through which the operator may enter demand for more or less movement in the chosen relative direction (also referred to as a motion demand input). In some embodiments, the accelerator 52 is in the form of a pedal with "infinitely variable" positioning such that an angle of the pedal is directly related to the demand for speed, and the pedal may be biased towards an initial position where the demand is for zero movement, i.e., releasing one's foot off of the pedal causes deceleration of the tracked vehicle until it stops. Optionally, a brake pedal or other mechanism may be provided through which the operator may enter a demand for deceleration. In still other embodiments the shifter 50 may include a feature whereby a gear level (low, high, neutral, 1st, 2nd, etc.) is selected by the operator.

The control inputs may additionally include a steering unit 40 (e.g., steering wheel, joystick, scroll bar, touch screen, lever, . . . ) through which the operator may enter a demand for turning the tracked vehicle 10 (i.e., changing the orientation of travel of the lower structure 26).

Figure 1D:
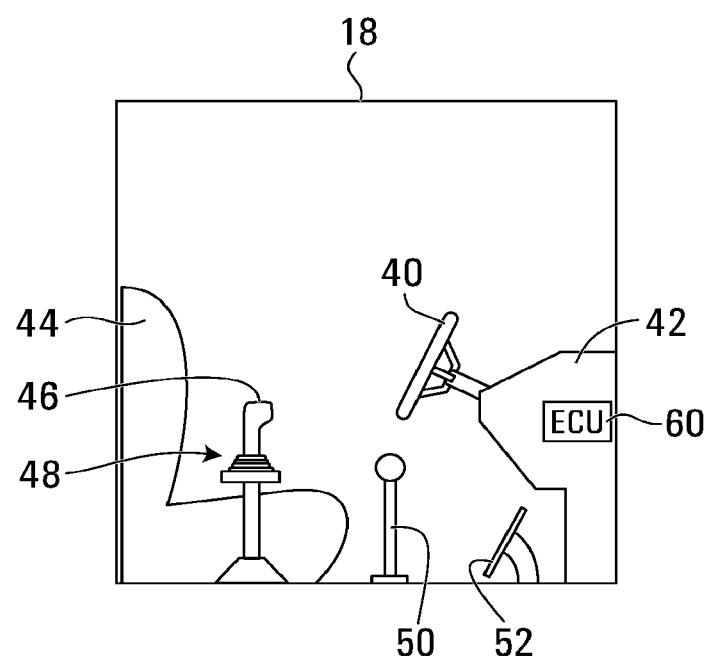
FIG. 1D is a side elevation view of a cabin of the tracked vehicle of FIGS. 1A and 1B.

The control inputs may further include the aforementioned work implement control center 48 through which the operator may enable, disable and/or control use of the work implement 20. The work implement control center 48 may be partly integrated with a seat 44 on which the operator sits. The control inputs may further optionally include a directionality control input 46 through which the operator may enter a "directionality switchover request" to be described later. The directionality control input 46 may be integrated with the work implement control center 48, as is illustrated in FIG. 1D, although this need not be the case in all embodiments.

Other control inputs not shown in the drawings may also be provided to control various other common aspects of a tracked vehicle 10 (e.g., ignition, radio, heating, seat adjustment, etc.).

Also provided is a plurality of sensors 202 (FIG. 2) which are configured to detect and/or measure a variety of parameters of the tracked vehicle and to send their outputs to the ECU 60. These sensors 202 may include, among others, a rotation speed sensor 204 which infers a speed of the tracked vehicle by measuring a rotating component of the tracked vehicle. For example, the rotation speed sensor 204 may measure the rotation speed of the hydrostatic motors 14X, 14Y, from which a speed of the tracked vehicle 10 may be calculated. In particular, an average may be taken of the two readings of the rotation speeds of the two hydrostatic motors 14X, 14Y. In addition, the plurality of sensors 202 may include an inclinometer 206 configured to measure a slope of the tracked vehicle 10, an odometer 210 configured to measure a distance traveled, a thermometer 208 configured to detect/measure temperature of engine oil or hydrostatic oil or an exterior temperature, to name a few non-limiting examples.

Figure 3:
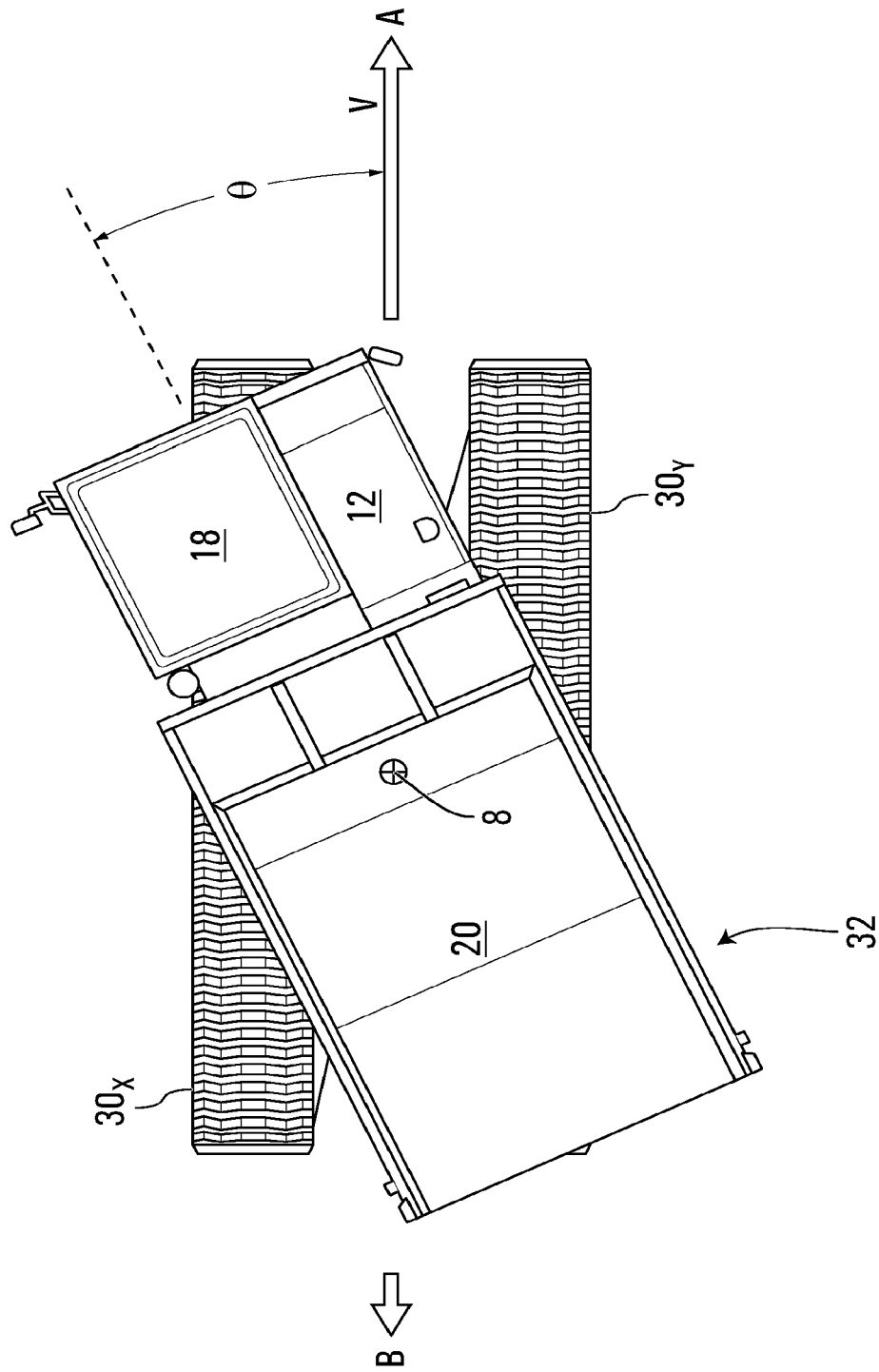
FIG. 3 is a top view showing the upper structure rotated relative to the lower structure by an angle θ.

The sensors 202 may further include an angle sensor 212 configured to detect/measure a degree of rotation of the upper structure 32 relative to an initial angular position. The initial angular position may be arbitrarily chosen and, as shown in FIG. 3, in this case the initial angular position is chosen to be in the direction A. Thus, the reading of the angle sensor 212 will be a value θ between −180 degrees and 180 degrees, taken with respect to a vector V pointing in the direction A. The angle sensor 212 is configured to provide its angular displacement readings to the ECU 60. The angle sensor 212 may be mounted to the upper structure 32 or to the lower structure 26 or may be partly mounted to both the upper structure 32 and the lower structure 26. By way of two non-limiting examples, the angle sensor 212 may be implemented as an encoder or as a potentiometer. An example of an encoder-based angle sensor is model ST350R (or ST350R-H1-360-1-1-X-P) from Sensor Systems SRL, Chiari, Italy, although a variety of other encoder-based angle sensors may be suitable. Potentiometer-based angle sensors may also be used.

The various control inputs and sensor outputs may be connected to the ECU 60 which processes them in accordance with a control algorithm so as to provide control of motion and operation of the tracked vehicle 10, including driving the track assemblies 31X, 31Y and manipulating the work implement 20. Also, the ECU 60 issues signals 220 that are used for conveying various data end events to the operator of the tracked vehicle.

To this end, the operator cabin 18 further includes an output interface for informing the operator about various conditions of the tracked vehicle 10 and/or the work implement 20. Specifically, the output interface may include a dashboard 42. The dashboard 42 may display a plurality of visual effects (e.g., lights, icons, symbols, pictograms, etc.) that may be controlled (e.g., illuminated) by the ECU 60. The visual effects may convey various data and events such as vehicle speed, engine speed (RPM), oil temperature, chosen relative direction, fuel level, etc. Other data and events can be signaled through optical alerts and will be described later. In addition, one or more loudspeakers (not shown) may be provided to signal data and events such as a backup warning signal. Additional data and events can be signaled through the loudspeaker by way of audible alerts as will be described later. The output interface may include other devices such as a screen, siren, etc.

Figure 2:
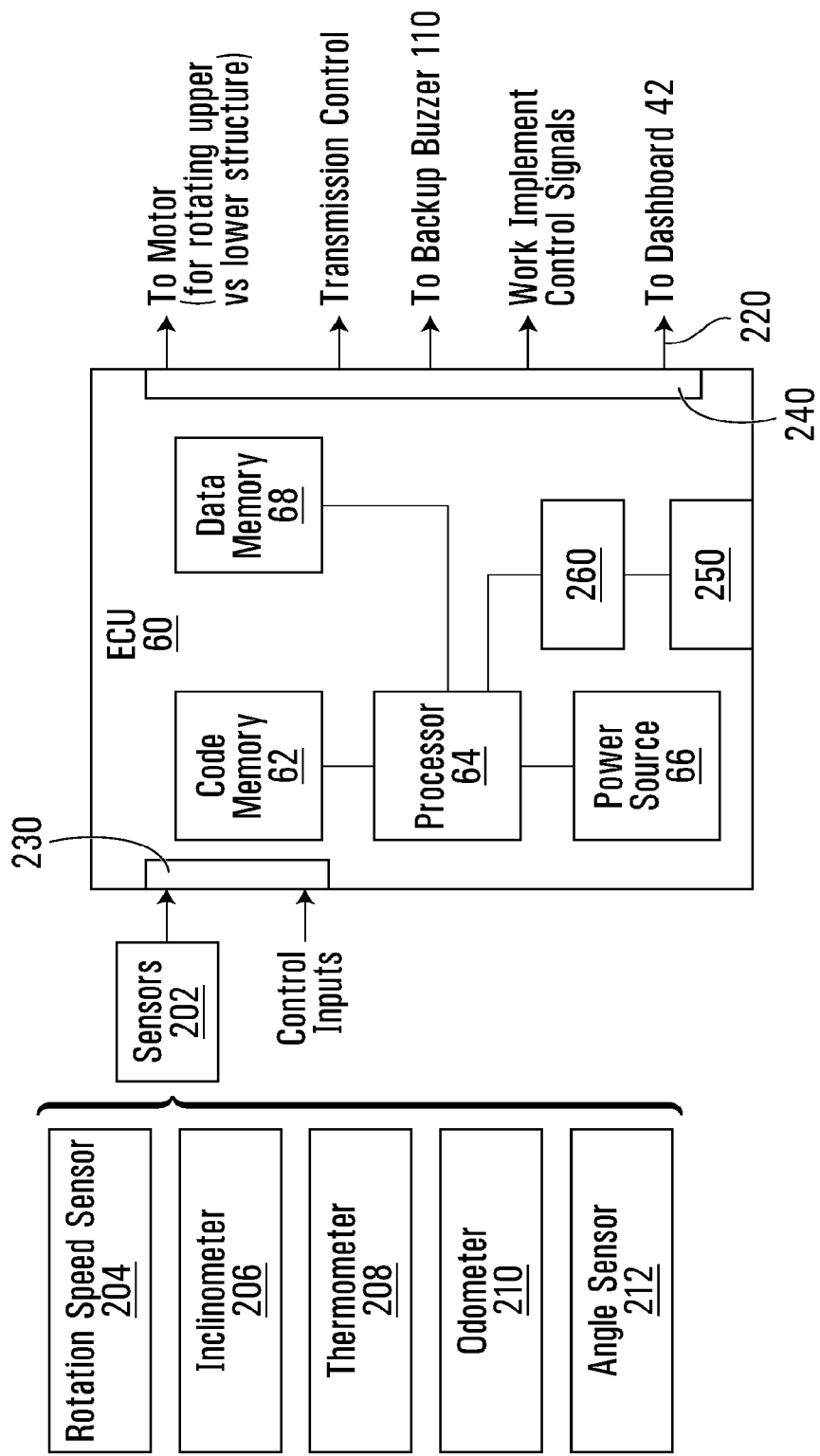
FIG. 2 is a block diagram showing an engine control unit (ECU) for controlling a motor that rotates the upper structure of the tracked vehicle relative to the lower structure.

With reference to FIG. 2, the ECU 60 may include a processor 64, a code memory 62, a data memory 68, a power source 66 (which may draw electric power from an alternator (not shown)), an input interface 230 and an output interface 240. Additionally, the ECU 60 may include a network interface 250 and network communication equipment 260, which allow communication with a network using wireless communication techniques. In an embodiment, the processor 64 is configured to execute computer-readable instructions stored in the control memory 62. The instructions encode a program (software) which, when executed by the processor, causes the processor 64 and/or the ECU 60 to execute a variety of tasks or routines. Each routine controls certain functionality of the tracked vehicle 10 based on certain control inputs, sensor outputs and/or parameters stored in the data memory 68.

Figure 4:
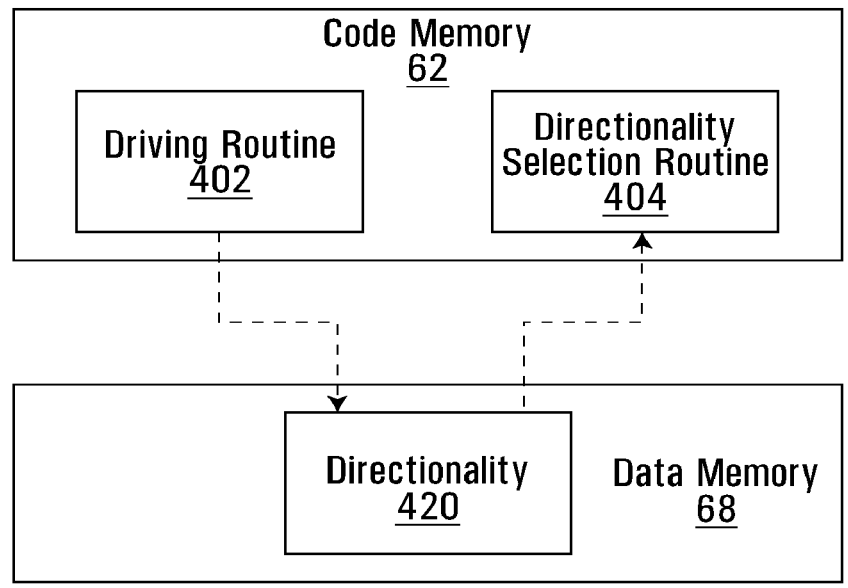
FIG. 4 is a block diagram conceptually illustrating routines, including a driving routine and a directionality selection routine, stored in code memory of the ECU and a directionality variable stored in a data memory of the ECU.

With reference to FIG. 4, for example, the routines may include, among others, a Driving Routine 402 that controls the supply of power to the drive wheels 22 of the opposing track assemblies 31X, 31Y and a Directionality Selection Routine 404 that controls a directionality parameter used by the Driving Routine 402. These two routines will be described below in further detail. Of course, other routines may be executed so as to control other aspects of the tracked vehicle 10 or work implement 20 operation, however these need not be described here in detail.

Figure 5:
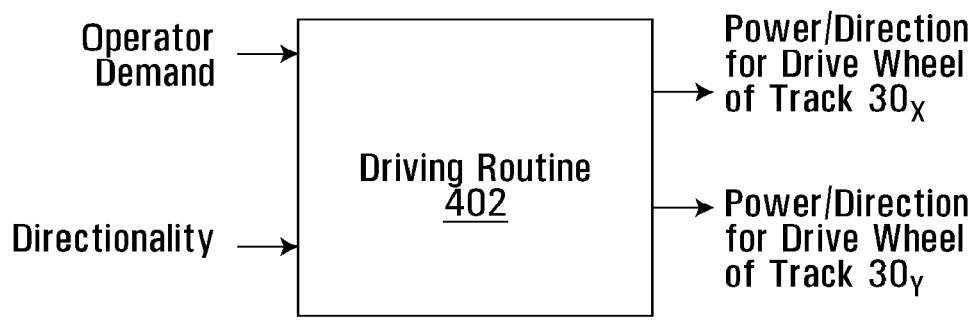
FIG. 5 is a block diagram showing inputs to and outputs of the driving routine that may be executed by a processor the ECU.

Driving Routine (FIG. 5)

According to this routine, the processor 64 responds to outputs from the shifter 50 (chosen relative direction), accelerator 52, (optionally) brake and steering unit 40 in order to provide instructions to the hydrostatic pumps for controlled distribution of the engine power to the hydrostatic motors 14X, 14Y connected to the track assemblies 31X, 31Y. In addition, the processor 64 accesses the current "directionality" of the tracked vehicle 10. The current "directionality" can refer to the direction (in this case, either A or B) in which the tracked vehicle 10 will move in response to a current demand for motion by the operator while the chosen relative direction is "forward" (e.g., stepping on the accelerator 52 while the shifter 50 is set to "drive").

In an example, the current directionality may be expressed as a global variable DIRECTIONALITY 420 that is stored in the memory 68 and modifiable by the Directionality Selection Routine 404 as discussed below. In an embodiment, DIRECTIONALITY may have a value of 0 or 1, where "DIRECTIONALITY=0" could signify that the tracked vehicle 10 will move in direction A in response to a demand for motion by the operator while the shifter 50 is set to "drive", while "DIRECTIONALITY=1" could signify that the tracked vehicle 10 will move in direction B under the same circumstances.

In another embodiment, DIRECTIONALITY 420 could be an integer that indicates the number of times that a directionality switchover has occurred, such that even values of DIRECTIONALITY 420 could signify that the tracked vehicle 10 will move in direction A in response to a demand for motion by the operator while the shifter 50 is set to "drive", and odd values of DIRECTIONALITY 420 could correspond to movement in direction B under the same circumstances.

Thus, according to the Driving Routine 402 (with the binary global variable DIRECTIONALITY 420 as described above), consider the response to operator demand for (perceived) forward motion when facing direction A (i.e., engaging (e.g., stepping on) the accelerator 52) while the shifter 50 is in "drive" and while DIRECTIONALITY 420 has a value of 0. This should result in motion of the tracked vehicle 10 in direction A. In that case, the processor 64 instructs the hydrostatic pump(s) 34X so as to cause the drive wheel 22 of track 30X to rotate in the counter-clockwise direction (when viewed from the outside of the tracked vehicle 10) and to cause the drive wheel 22 of track 30Y to rotate in the clockwise direction (when viewed from the outside of the tracked vehicle 10). Thus, movement of the tracked vehicle 10 as perceived by the operator corresponds to the chosen relative direction ("forward").

The amount of power that the processor 64 instructs the transmission 1610 (i.e., the hydrostatic pumps 34X, 34Y) to feed to each drive wheel hydrostatic motor 14X, 14Y may depend on the output of the accelerator 52, while the relative proportion of power that the processor 64 instructs the transmission 1610 to feed to each drive wheel hydrostatic motor 14X, 14Y may depend on the output of the steering unit 40. Naturally, when pressure on the accelerator 52 is released (or when the brake is applied, as appropriate), the processor 64 will instruct the transmission 1610 to reduce the amount of power transmitted to the motors 14X, 14Y coupled to the drive wheels 22.

On the other hand, consider now the response to operator demand for forward motion when facing direction B (i.e., engaging (e.g., stepping on) the accelerator 52) while the shifter 50 is in "drive" and while DIRECTIONALITY 420 has an opposite value of 1. This should result in motion of the tracked vehicle 10 in direction B. In that case, the transmission 1610 is instructed by the processor 64 to cause the drive wheel 22 of track 30X to rotate in the clockwise direction (when viewed from the outside of the tracked vehicle 10) and to cause the drive wheel 22 of track 30Y to rotate in the counter-clockwise direction (when viewed from the outside of the tracked vehicle 10). Here again, since the operator is facing direction B, movement of the tracked vehicle 10 as perceived by the operator corresponds to the chosen relative direction ("forward").

Conversely, operator demand for reverse motion when facing direction A (i.e., engaging (e.g., stepping on) the accelerator 52) while the shifter 50 is in "reverse" and while DIRECTIONALITY 420 has a value of 0 should result in motion of the tracked vehicle 10 in direction B, while operator demand for reverse motion when facing direction B (i.e., engaging (e.g., stepping on) the accelerator 52) while the shifter 50 is in "reverse" and while DIRECTIONALITY 420 has a value of 1 should result in motion of the tracked vehicle 10 in direction A. In both cases, movement of the tracked vehicle 10 as perceived by the operator corresponds to the chosen relative direction ("reverse").

Figure 6:
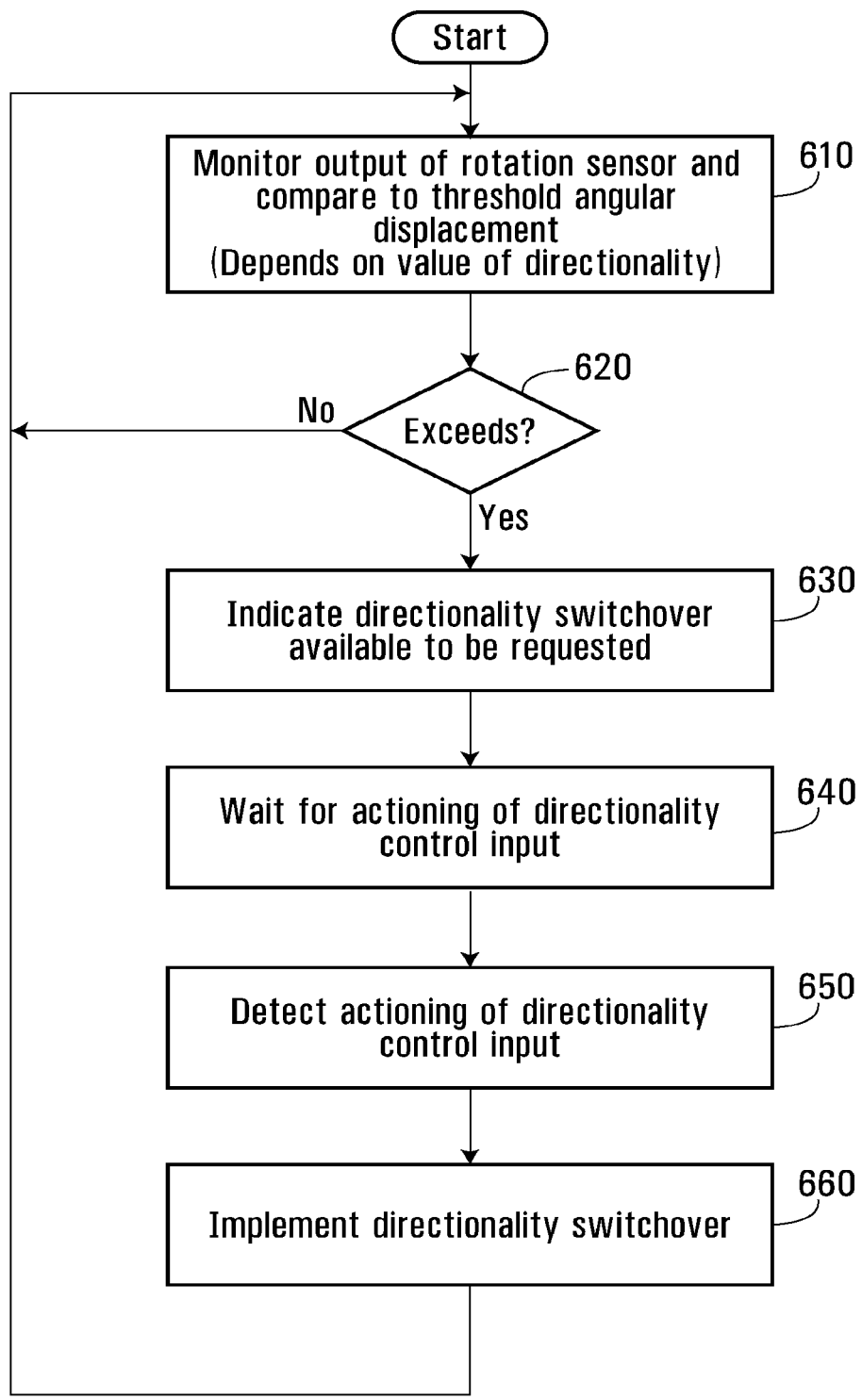
FIG. 6 is a flowchart illustrating operation of the directionality selection routine that may be executed by the processor the ECU.

Directionality Selection Routine (FIG. 6)

According to this routine, at step 610, the processor 64 monitors the output of the angle sensor 212 and compares it continually to a threshold angular displacement, which depends on the value of DIRECTIONALITY 420. For example, when DIRECTIONALITY 420 has a first value, the threshold angular displacement may be 0 degrees, and when DIRECTIONALITY 420 has a second value, the threshold angular displacement may be 180 degrees. The output of the angle sensor 212 indicates the angular displacement relative to an initial angular position, such as a vector that points in the direction A (noting, however, that this was chosen merely for convenience and need not be the case in every embodiment). Alternatively and equivalently, the threshold angular displacement may remain constant and the readings obtained from the angle sensor could be either not adjusted or adjusted by 180 degrees, depending on the value of DIRECTIONALITY 420.

Noting also that the upper structure 32 may rotate bidirectionally relative to the lower structure 26, the output of the angle sensor 212 may be compared to a range bounded by a lower threshold (minus 90 degrees) and an upper threshold (plus 90 degrees); alternatively, the magnitude (absolute value) of the output of the angle sensor 212 may be compared to a single threshold (e.g., 90 degrees). At step 620, if the magnitude of the output of the angle sensor 212 is not greater than the threshold angular displacement (e.g., 90 degrees), then the processor returns to step 610 but if the magnitude of the output of the angle sensor 212 is in excess of the threshold angular displacement, this means that the operator cabin 18 has swung more towards what the operator would perceive to be the "reverse" direction than what he or she would perceive to be the "forward" direction. In that case, the processor proceeds to step 630 and causes a signal to be emitted via the output interface 260 to indicate that a directionality switchover is available to be requested.

Figure 11:
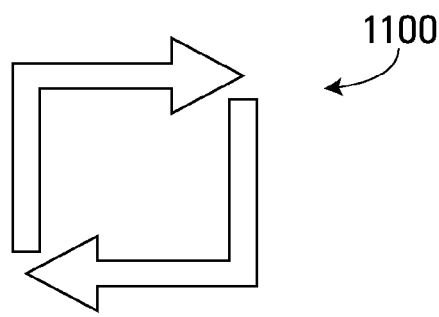
FIG. 11 illustrates a pictogram for signaling to an operator of the tracked vehicle that directionality of the tracked vehicle is available to be switched over.

In particular, and with reference to FIG. 11, the processor 64 may case a pictogram 1100 to light up on the dashboard 42 to signal to the operator that he or she may now request that the directionality of the tracked vehicle 10 be switched over (reversed). To this end, and in one embodiment, the processor 64 proceeds to step 640 where the processor 64 waits for the operator to enter a directionality switchover request by actioning the directionality control input 46. The directionality control input 46 may take the form of a separate, dedicated button, a multi-function button on a touch screen of an integrated device or smartphone networked/paired with the ECU 60, a microphone for receiving voice commands, etc.

In another embodiment, it should be appreciated that step 630 is optional and that the processor 64 may proceed to wait for an operator-initiated directionality switchover request at step 640 without explicitly having alerted the operator of such a switchover being available to be requested. This would require the operator to keep track of the relative angle of the upper and lower structures 32, 26 so as to know when a directionality switchover request will be honoured and when it will not.

In yet another embodiment, instead of waiting, at step 640, for the operator to enter a directionality switchover request by actioning the directionality control input 46, the processor 64 itself automatically proceeds to generate, internally, a directionality switchover request. This could be done on the condition that the operator had previously indicated, through a control input and as recorded by the processor 64, that the operator requested an automatic switchover mode. In yet another embodiment, the directionality switchover request is automatically generated only when the magnitude of the output of the angle is in excess of a second threshold angular displacement. That is to say, manual switchover is permitted at angles between the first and second angular displacements, where the operator has the option of commanding a directionality switchover request but when the angle becomes too great (i.e., exceeds the second threshold angular displacement), the directionality switchover is internally generated without operator input.

Assuming that the directionality switchover request is either manually entered by the operator actioning the directionality control input 46 (as detected by the processor 64 at step 650) or by virtue of having been internally generated by the processor 64 (in automatic switchover mode, possibly only when the second threshold angular displacement has been exceeded), the next step is step 660, whereby the processor 64 implements a directionality switchover for the tracked vehicle 10. This can be done by updating, incrementing or toggling DIRECTIONALITY 420 used by the Driving Routine 402, which has been previously described.

Thus, if prior to step 660, the tracked vehicle 10 moved in direction A in response to operator demand for forward movement (e.g., pressing on the accelerator pedal 52 with the tracked vehicle in "drive"), then after step 660, the tracked vehicle 10 will now move in direction B in response to operator demand for forward movement (e.g., pressing on the accelerator pedal with the tracked vehicle 10 in "drive"); and vice versa.

Stated differently, prior to implementing the directionality switchover, the track assemblies are controlled so as to achieve movement of the tracked vehicle in a first direction in response to operator demand for forward movement of the tracked vehicle and in a second direction opposite the first direction in response to operator demand for reverse movement of the tracked vehicle; whereas after implementing the directionality switchover, the track assemblies are controlled so as to achieve movement of the tracked vehicle in the second direction in response to operator demand for forward movement of the tracked vehicle and in the first direction in response to operator demand for reverse movement of the tracked vehicle. The first and second directions can be opposite to one another.

It should be appreciated that the pictogram 1100 that was caused to be lit up on the dashboard 42 at step 630 may be extinguished in response to receiving the directionality switchover request at step 650 or after implementing the directionality switchover at step 660. A signal (e.g., an audible sound), under control of the ECU 60, may be issued via the loudspeaker to indicate that the directionality switchover has been initiated or has successfully taken place.

At this point, i.e., after execution of step 660, the processor 64 returns to step 610, where the processor 64 again proceeds to monitor the output of the angle sensor 212 and continually compares the magnitude of the output of the angle sensor 212 to the threshold angular displacement. However, due to the new value of DIRECTIONALITY 420, the threshold angular displacement should now be adjusted by 180 degrees (e.g., it is now minus 90 degrees) or the threshold angular displacement may remain as before (at 90 degrees) and the readings obtained from the angle sensor could be adjusted by 180 degrees.

Then, at step 620, if the magnitude of the output of the angle sensor 212 is in excess of the (new) threshold angular displacement, this means that the operator cabin has 18 once again swung towards what the operator currently perceives as being the reverse direction. In that case, the processor 64 proceeds to step 630 and causes a signal to be emitted via the output interface 260 to indicate that a directionality switchover is, once again, available to be requested. The processor 64 then proceeds to step 640 where the processor 64 waits for the operator to enter a directionality switchover request via the directionality control input 46. Assuming once again that the operator enters a directionality switchover request via the directionality control input 46 (or one is automatically generated), this is detected by the processor 64 at step 650, and then at step 660, the processor 64 implements a second directionality switchover for the tracked vehicle 10. This can be done by re-toggling the DIRECTIONALITY global variable used by the Driving Routine 402, so that it regains its value prior to the previous execution of step 660, described above.

Thus, if prior to the first execution of step 660, the tracked vehicle 10 moved in direction A in response to operator demand for forward movement (e.g., pressing on the accelerator pedal 52 with the tracked vehicle 10 in "drive"), then after the second execution of step 660, the tracked vehicle 10 will also move in direction A in response to operator demand for forward movement (e.g., pressing on the accelerator pedal 52 with the tracked vehicle 10 in "drive"). This is because two (or, more generally, an even number of) directionality switchovers have occurred in the meantime. A signal (e.g., an audible alert, possibly different than the one previously issued) may be generated to indicate that the directionality switchover has occurred again.

Thus it will be appreciated that if the "original" factory setting of the DIRECTIONALITY 420 variable is such that operator demand for "forward" motion results in the tracked vehicle 10 moving in direction A, then this will be the case after each even-numbered directionality switchover. On the other hand, after each intervening (odd-numbered) directionality switchover, operator demand for "forward" motion results in the tracked vehicle 10 moving in direction B (and operator demand for "reverse" motion results in the tracked vehicle 10 moving in direction A).

Those skilled in the art will appreciate that it is within the scope of the present invention to monitor whether the current value of DIRECTIONALITY 420 is indeed the same as the factory setting and to display this fact (or discrepancy) on the dashboard 42. Also, the number of times that the directionality switchover has been implemented may be monitored by the processor 64 and displayed via an output device, such as via a numerical reading on the dashboard 42. These additional dashboard features can complement the Directionality Selection routine 404.

Furthermore, the processor 64 may permanently store in memory the factory setting of the DIRECTIONALITY 420 global variable. Also, the current setting of DIRECTIONALITY 420 could be recalled when the tracked vehicle 10 is started/turned on so that based on this information, and the indication of whether the upper structure 32 has rotated beyond the threshold angular displacement, whether the operator cabin 18 is facing the same way as in the factory. Likewise, it is possible for the processor 64 to cause issuance of a signal to indicate whether the current value of DIRECTIONALITY 420 is different from the factory setting. This could allow the operator to know that repositioning of the upper structure 32 relative to the lower structure 26 is required at the end of their shift or before turning off the tracked vehicle 10.

Those skilled in the art will appreciate that one or more additional conditions may need to be met in order for the directionality switchover to be implemented. These additional conditions could include vehicle stability conditions and/or vehicle operating conditions. An example of a vehicle stability condition could be that the speed of the tracked vehicle 10 (e.g., as reported by the rotation speed sensor 204 or other speedometer) needs to be zero or below a certain threshold maximum value. Another example of a vehicle stability condition could be that tracked vehicle 10 be parked or geared in neutral. A further example of a vehicle stability condition could be that the accelerator pedal 52 is not being pressed and/or that the brake pedal is being pressed. An example of a vehicle operating condition could be that the work implement 20 has been enabled through activation of a work implement activation lever forming part of the work implement control center 48.

Figure 7:
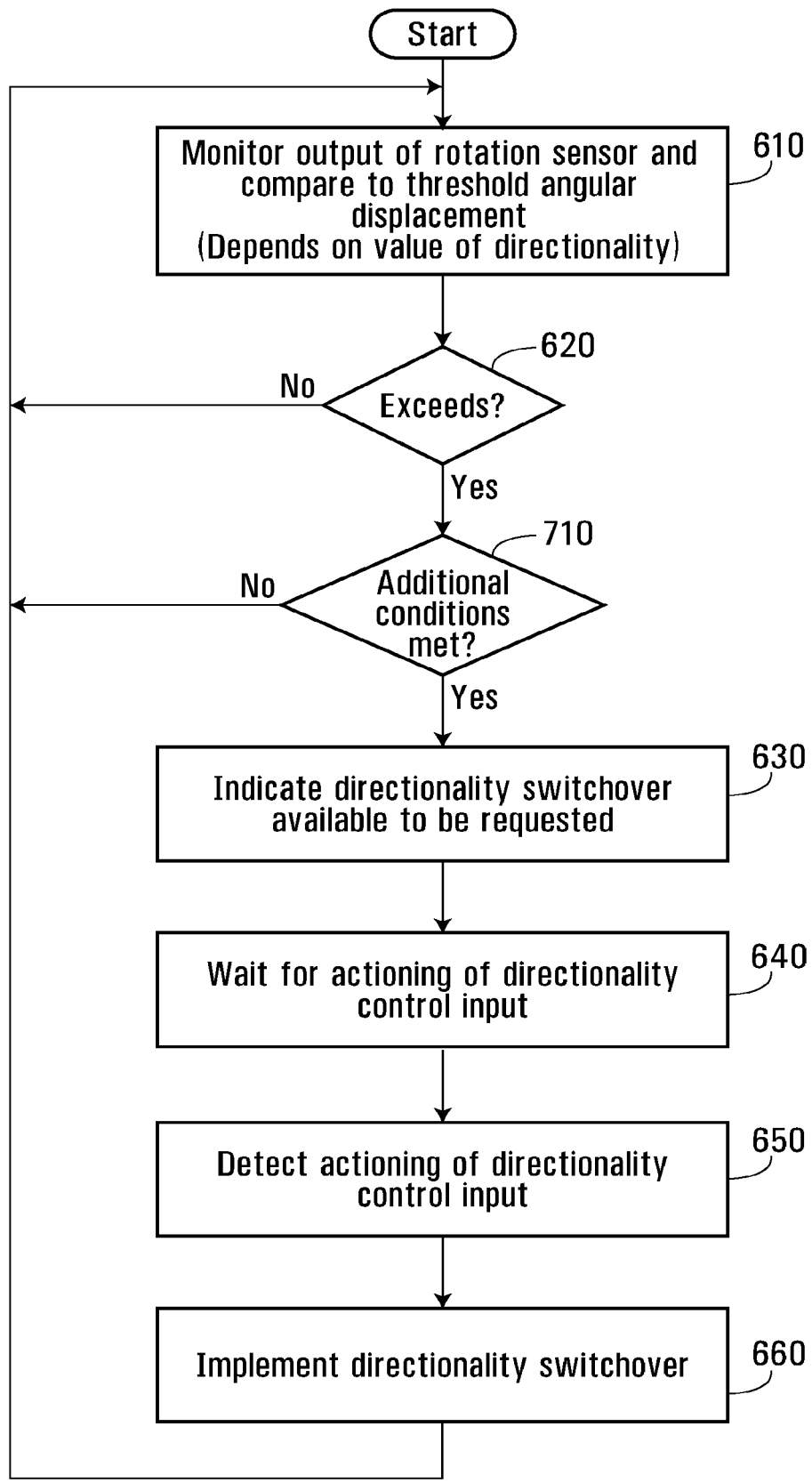
FIGS. 7 and 8 are flowcharts similar to that of FIG. 6 but incorporating the verification of additional conditions, according to two variants of the directionality selection routine.
Figure 8:
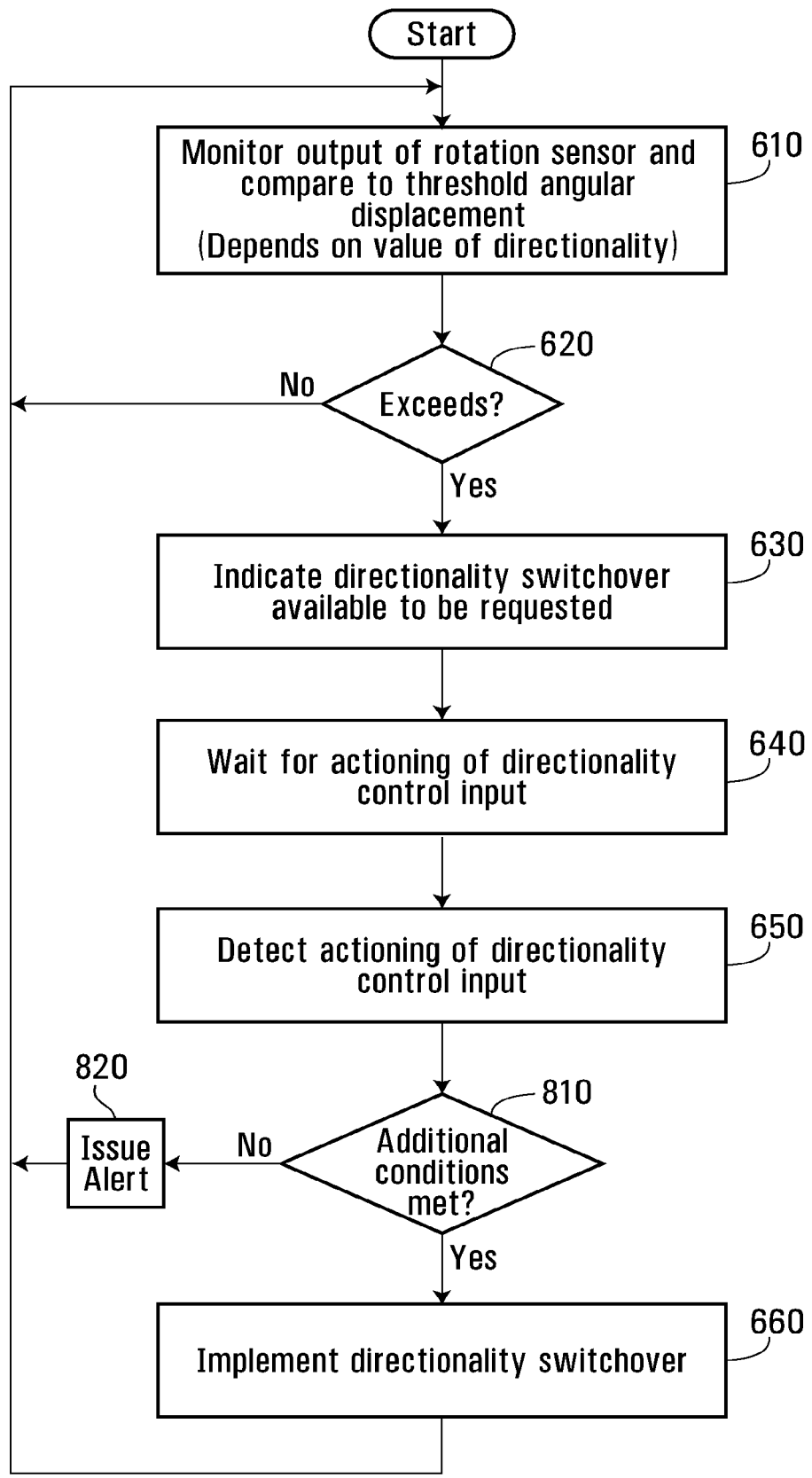

The requirement to satisfy one or more additional conditions can be incorporated into the Directionality Selection routine 404 in a number of ways. For example, the flowchart in FIG. 7 shows that the additional conditions need to be met (step 710) before step 630, i.e., before causing a signal to be emitted via the output interface to indicate that a directionality switchover is available to be requested. In another example, the flowchart in FIG. 8 shows that the additional conditions need to be met before implementing the directionality switchover at step 660 and even before the operator enters a directionality switchover request at step 650, such that if the operator enters a directionality switchover request at step 650 without the additional conditions having been met (step 810), this will result in the issuance of an alert (e.g., audible or visual) at step 820 and the directionality switchover will not occur (until, of course, the additional condition is satisfied). That is to say, the alert signals non-implementation of a directionality switchover despite there having been a request for a directionality switchover.

It should be further appreciated that if at some point the angle sensor 212 detects that the magnitude of the output of the angle sensor 212 is back down to less than 90 degrees (which can result from a return to the original orientation of the upper structure 32 or from over-rotation past 270 degrees, or the second threshold angular displacement and the first threshold angular displacement being displaced by 180 degrees) before the operator has entered a request for a directionality switchover, then the opportunity to request a directionality switchover will be withdrawn. For example, if a pictogram was displayed on the dashboard 42 to indicate that the magnitude of the output of the angle sensor 212 was greater than 90 degrees, this pictogram could cease to be displayed on the dashboard 42. Thus, if a directionality switchover request is received once the angle sensor detects that the magnitude of the output of the angle sensor 212 is back down to less than 90 degrees, the processor 64 will not cause a directionality switchover to be implemented.

In a further variant, if there are additional conditions (e.g., one or more stability conditions and/or one or more operating conditions) that have to be satisfied, this fact could be separately conveyed to the operator. For example, the processor 64 could execute a separate routine to monitor whether the additional conditions are being met, resulting in a separate output signal being emitted via the output interface (e.g., a second visual effect or audible alert) to advise the operator of the tracked vehicle 10 as to the status of the additional conditions. In yet a further variant, the signal emitted at step 30 could have two "on" values, one that indicates that the additional conditions have not been met and the other that indicates that the additional conditions have been met (and therefore indicating that a directionality switchover request will be accepted). This would assist the operator in assessing whether to even consider requesting a directionality switchover.

Figure 9:
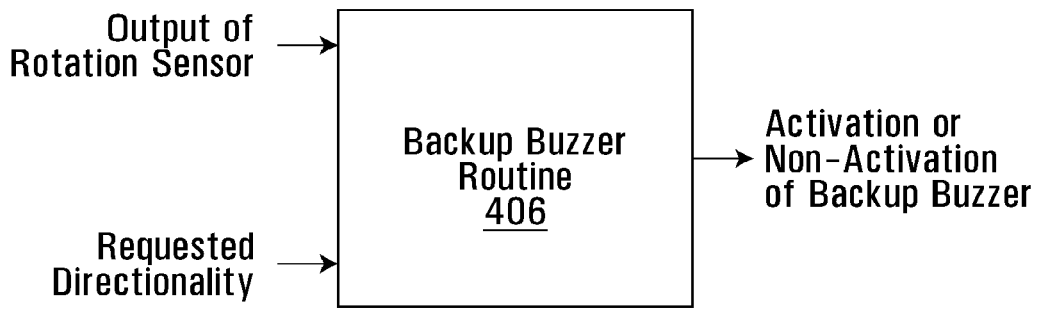
FIGS. 9 and 10 are block diagrams showing inputs to and outputs of, respectively, a backup buzzer routine and a light color routine that may be executed by the processor of the ECU.

Those skilled in the art will further appreciate that certain other functionalities of the tracked vehicle 10 may also be influenced by rotation of the upper structure 32 beyond the threshold angular displacement. For example, the tracked vehicle 10 may further comprise a backup buzzer 110. In some embodiments, the backup buzzer 110 may be a loudspeaker that is emits a certain specific sound when instructed by the ECU 60. The processor in the ECU 60 may run a routine (e.g., computer-readable instructions that encode a backup buzzer routine and may be stored in the code memory 62) to determine when to issue a control signal to the backup buzzer 110 so as to cause the backup buzzer 110 to output its characteristic sound. To this end, FIG. 9 shows collection of the output of the angle sensor 212 and the directionality requested by the operator from the output of the shifter 50 (i.e., forward or reverse). Based on the collected values, the backup buzzer 110 may be activated.

For example, in the case where shifter 50 indicates that the operator has requested forward motion (by putting the engine in drive), the backup buzzer 110 will sound when the output of the angle sensor 212 has exceeded the threshold angular displacement (which, it will be recalled, depends on the DIRECTIONALITY global variable 420), because this means that by stepping on the accelerator 52, the tracked vehicle 10 will be perceived to be moving backwards. Analogously, in the case where shifter indicates that the operator has requested reverse motion (by putting the engine in reverse), the backup buzzer 110 will sound until the output of the angle sensor 212 has exceeded the threshold angular displacement, at which point it will no longer sound. This is because even though there is a demand for reverse motion, the upper structure 32 is over-rotated and the operator perceives forward motion. Thus, it is noted that operation of the backup buzzer 110 does not depend on the value of DIRECTIONALITY 420. Instead, the value of DIRECTIONALITY influences the outcome of step 910 which measures whether the output of the angle sensor 212 has exceeded the threshold angular displacement, because the outcome will be different for the two different directionalities.

Figure 10:
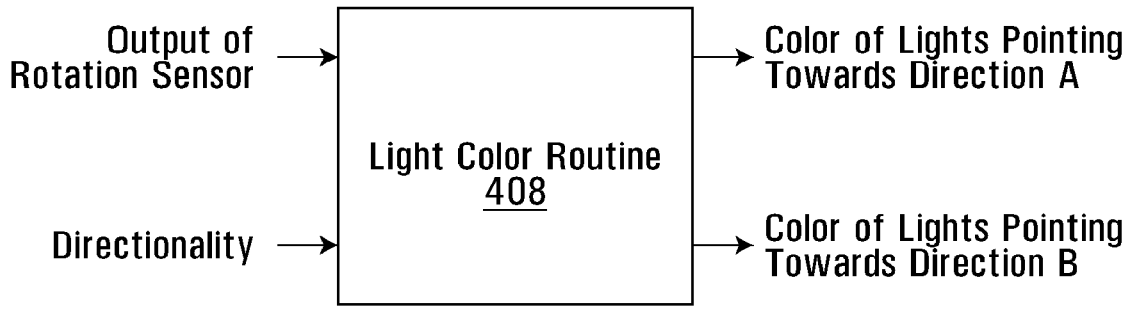

In another example, the tracked vehicle 10 may be required to have lights of certain colors to signal the direction in which it is traveling and/or to illuminate the roadway ahead of it. For example, the traditional color for headlights is clear and the traditional color for taillights is red. However, it is possible for the tracked vehicle 10 to move symmetrically in either direction A or direction B and therefore whether it displays headlights or taillights is not a function of the extremity of the tracked vehicle but more a function of the direction in which the operator cabin 18 is facing with respect to movement of the tracked vehicle 10. As such, lights of both colors (either separate bulbs or using a controllable-wavelength LEDs, etc.) could be provided at both extremities of the tracked vehicle in a lengthwise direction. Then, with reference to FIG. 10, a Light Color routine could be executed by the processor. Specifically, when DIRECTIONALITY 420 is 0 and the output of the angle sensor 212 has not exceeded the threshold angular displacement, the lights pointing towards direction A could be headlights (clear) and the lights pointing towards direction B could be taillights (red); however, the color of the lights could be inverted when the output of the angle sensor 212 exceeds the threshold angular displacement, because now the operator is facing direction B and requires illumination of the roadway in front of him or her with clear lighting. Analogously, when DIRECTIONALITY 420 is 1 and the output of the angle sensor 212 has not exceeded the threshold angular displacement, this means that the operator is facing direction B and thus the lights pointing towards direction B could be headlights (clear) and the lights pointing towards direction A could be taillights (red); here again, the color of the lights could be inverted when the output of the angle sensor 212 exceeds the threshold angular displacement. It is noted that the aforementioned light-toggling functionality occurs irrespective of whether a directionality switchover is requested or implemented.

In accordance with another embodiment of the present invention, the tracked vehicle provides at least partly automatic alignment of the upper structure 32 with the lower structure 26 at a predetermined relative angle. This may be beneficial in situations where, for example, the operator wishes to drive the tracked vehicle 10 on a roadway and before doing so, alignment of the upper and lower structures 32, 26 needs to be achieved.

To this end, one of the control inputs (e.g., provided by the work implement control center 48) may be a "smart alignment" input through which the operator can enter a command to align the upper structure 32 relative to the lower structure 26. The smart alignment input may be a physical button, switch, lever or soft button, to name a few non-limiting possibilities. The smart alignment input may be part of the steering unit 40 or of the work implement control center 48. In other embodiments, the command to align the upper structure 32 relative to the lower structure 26 may be entered by the operator through a smartphone that communicates with the processor 64, and thus the smartphone acts as the smart alignment input. The smart alignment input sends its readings to the ECU 60 so that the ECU 60 can determine/detect when the operator desires at least partly automatic alignment of the upper structure relative 32 to the lower structure 26.

The predetermined relative angle may be stored in the memory 68 and may be obtained from the memory 68 by the processor 64 during an initialization operation, for example. Alternatively, the predetermined relative angle may be an operator-controlled value and to this end, one of the control inputs may allow the operator to enter the predetermined relative angle (e.g., via a keyboard or dial or switch or smartphone). Also, there may be multiple candidate predetermined relative angles to choose from, including a pair of predetermined relative angles that are 180 degrees apart. In one specific non-limiting embodiment, a first predetermined relative angle of 0 degrees and a second predetermined angle of 180 degrees each represent the upper structure 32 and lower structure 26 being parallel to one another, but the two different predetermined relative angles suggest that in one case the upper structure 32 is "swung around" by a half turn.

It should be appreciated that in the present embodiment, the work implement 20 may be disposed on the upper structure 32 but the operator cabin 18 may be disposed on either the upper structure 32 or the lower structure 26.

Smart Alignment Routine

Figure 12:
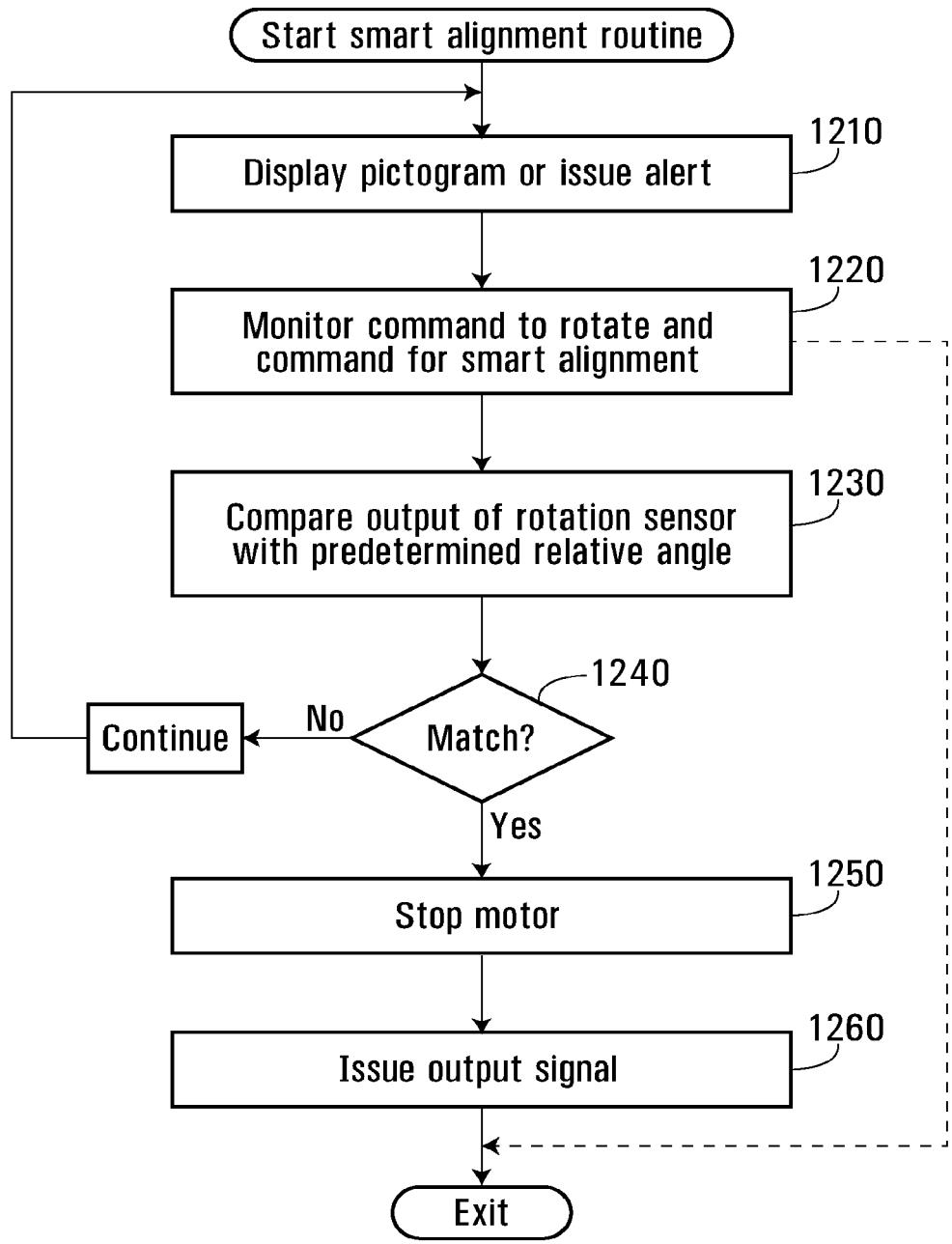
FIG. 12 is a block diagram showing inputs to and outputs of a smart alignment routine that may be executed by the processor the ECU.

In accordance with the present embodiment, the processor 64 of the ECU 60 executes a Smart Alignment routine, which is now illustrated with reference to FIG. 12. The processor 64 may start the Smart Alignment routine in response to the processor 64 detecting an operator command to rotate the upper structure 32 relative to the lower structure 26 (e.g., based on operator input at the work implement control center 48, whereby the operator may activate or apply at least a certain amount of force to a joystick, button or other controller to express an intent to rotate the upper structure) and an operator command to align the upper structure 32 relative to the lower structure 26 (e.g., based on operator input at the work implement control center 48, whereby the operator may activate the smart alignment input).

Figure 13:
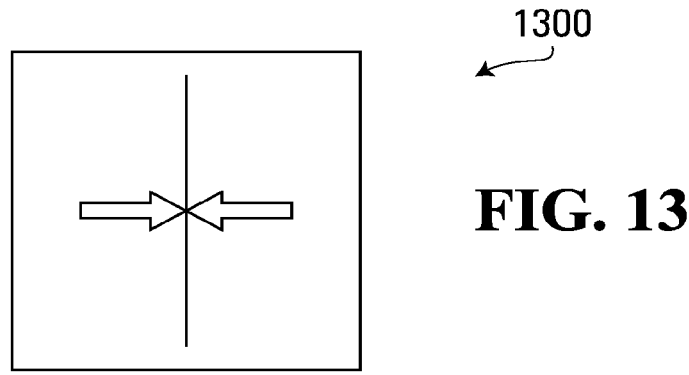
FIG. 13 illustrates a pictogram for signaling to an operator of the tracked vehicle that a smart alignment option has been selected.

Accordingly, and with reference to FIG. 13, once the Smart Alignment routine has been started, at step 1210, a pictogram 1300 can be displayed on the dashboard 42 to signal that a smart alignment option has been selected. At step 1220, the processor 64 monitors the command to rotate the upper structure 32 relative to the lower structure 26 and the command to align the upper structure 32 relative to the lower structure 26, in order to ensure that both commands continue to be supplied by the operator and therefore rotation of the upper structure relative 32 to the lower structure 26 is continued. In an embodiment, a command could be detected as being continually supplied if the operator is detected as continually pressing a button or exerting force on an interface component. Should any of these commands be released or cease to be supplied, the processor 64 exits the Smart Alignment routine and control returns to normal.

At step 1230, the output of the angle sensor 212 is collected by the processor 64 and compared to the predetermined relative angle. When there is a match between the output of the angle sensor 212 and the predetermined relative angle, at step 1240, the processor 64 may stop operation of the motor (step 1250) and issue an output signal at step 1260. The output signal may be an optical alert issued via a visual effect on the dashboard 42, which could cause the same visual effect as described in the context of step 1210. Alternatively, the output signal may be an audible alert issued via a loudspeaker. This signals to the operator that alignment is complete, i.e., the upper structure 32 is aligned with the lower structure 26 at the predetermined relative angle.

Once alignment is complete, the operator may wish to stop rotation of the motor 100, and this can be done, as previously described, by releasing the command to rotate the upper structure 32 relative to the lower structure 26 or the command to align the upper structure 32 relative to the lower structure 26. However, there may be a delay in the operator response. For this reason, it is within the scope of the invention for the processor 64 to ignore its commanding of a continued rotation of the upper structure for a short period (e.g., a few seconds) after alignment has been achieved in order to give the operator a chance to respond by releasing the command to rotate the upper structure 32 relative to the lower structure 26 and/or the command to align the upper structure 32 relative to the lower structure 26.

In an alternative embodiment, the command to rotate the upper structure 32 relative to the lower structure 26 and/or the command to align the upper structure 32 relative to the lower structure 26 do not need to be continuously supplied, but instead can be one-time entries (e.g., by pressing a button on a screen). Once these entries have been made (or, alternatively, a single combined-purpose command has been entered, as recognized by the ECU 60), the processor 64 will enter the Smart Alignment routine, but the processor 64 does not need to execute step 1220, i.e., the processor 64 does not need to monitor the command to rotate the upper structure 32 relative to the lower structure 26 and the command to align the upper structure 32 relative to the lower structure 26, because it is not required that both commands continue to be supplied by the operator. Rotation of the upper structure 32 relative to the lower structure 26 therefore continues autonomously until there is a match between the output of the angle sensor 212 and the predetermined relative angle. This alternative embodiment may be considered fully automatic or "hands off". In this alternative embodiment, in order to halt rotation and/or exit the Smart Alignment routine, the operator can explicitly halt rotation by entering a "halt" command via one of the control inputs.

In another alternative embodiment, it is recognized that there is a nonzero time it takes to stop operation of the motor 100 following the time that the upper structure 32 is measured to be at a specific angular position relative to the lower structure 26 (and by the time the operator reacts). Accordingly, the output of the angle sensor 212 may be collected by the processor and compared to an "offset angle", which is an angle that is slightly offset from the predetermined relative angle. When there is a match between the output of the angle sensor 212 and the offset angle, the processor 64 may halt operation of the motor and issue the aforementioned output signal. In this alternative embodiment, the nonzero time it takes to stop operation of the motor 100 following the time that the upper structure 32 was at a relative angular position that is detected as being the offset angle is calibrated such that during this nonzero time, the upper structure 32 rotates by the very difference between the pre-determined relative angle and the offset angle. This may result in improved alignment (closer to the predetermined relative angle).

Figure 14:
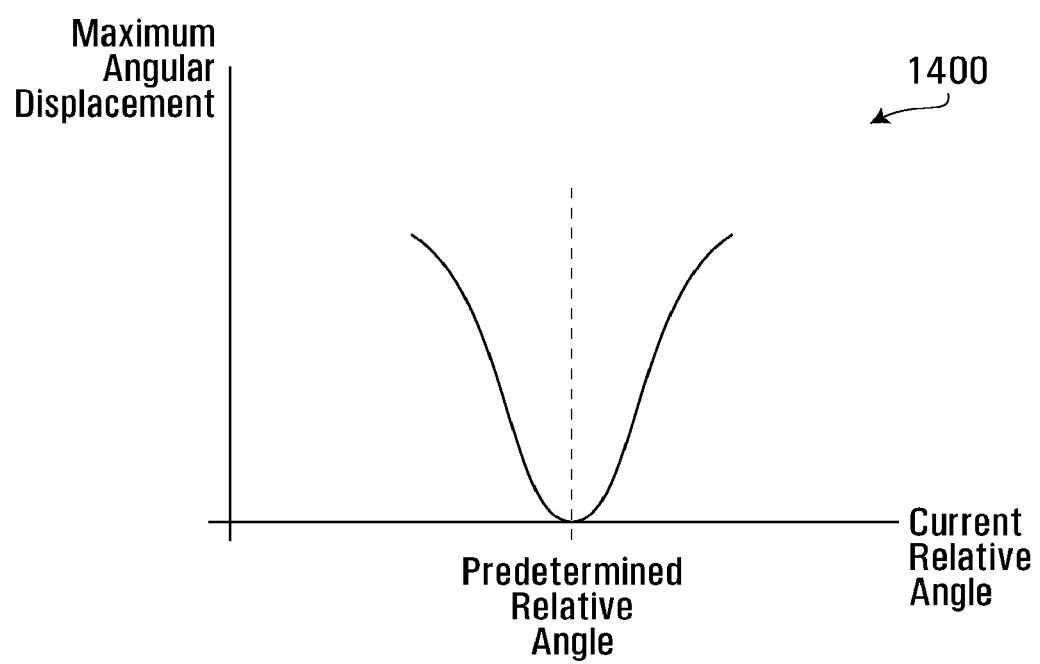
FIG. 14 illustrates an angular displacement limit curve for use in the smart alignment routine.

In a further alternative embodiment, the maximum angular velocity of the upper structure 32 (relative to the lower structure 26) may be limited by the processor during execution of the Smart Alignment routine. To this end, FIG. 14 shows an angular displacement limit curve 1400, which indicates how the speed of rotation (angular displacement over time) is limited by the current relative angle of the upper and lower structures 32,26 with respect to the predetermined relative angle. It is seen that at current relative angles that are near the predetermined relative angle, angular displacement (rotation speed) is lower, i.e., more severely limited, than when the current relative angle differs greatly from the predetermined relative angle. This means that despite the operator's continuing exertion of force on a control input (e.g., joystick, etc.) to rotate the upper structure 32 relative to the lower structure 26, the fact that the Smart Alignment routine has been entered means that the processor 64 will impose a "slowdown" (to a minimum angular velocity possibly as low as zero) as the upper structure 32 approaches alignment with the lower structure 26 at the predetermined relative angle. Of course, FIG. 14 is merely a conceptual example of an angular displacement curve, and other curves are possible, including curves that are more smooth and less smooth, as well as curves that are not symmetric about the predetermined relative angle. Of course, there may be other limitations on angular displacement that may override those of the angular displacement curve for various reasons such as safety.

In some embodiments, the way that alerts pertaining to smart alignment are signaled may be different than described above. For example, an audible or optical alert may be issued when entering the smart alignment routine and may continue to issue during execution of the smart alignment routine but then may cease to be issued when alignment has been achieved and/or when the processor 64 exits the Smart Alignment routine.

It should be appreciated that for various reasons (e.g., safety), once the processor 64 enters the Smart Alignment routine, forward or backward motion of the tracked vehicle 10 (or movement anywhere along the plane pf travel) may be disabled, although it may be enabled in some circumstances (e.g., at low speeds).

Those skilled in the art will appreciate that it is possible for the angle sensor to fail. In that case, the processor may detect that the angle sensor 212 has failed. For example, the processor may come to this conclusion when the upper structure 32 is rotating relative to the lower structure 26 (which can be inferred based on the control signal being supplied to the motor 100) yet the reading from the angle sensor 212 does not change or changes erratically. In that case, the output of the angle sensor 212 is unreliable and the processor 64 may cease to provide the operator with any further opportunity to request a directionality switchover or may ignore any request for a directionality switchover as the operator may have been provided with incorrect information. A backup angle sensor (not shown) may be relied upon in that situation. Alternatively, multiple angle sensors may be used at all times such that a combination of the values (e.g., the average) of the output of two or more angle sensors (whose outputs are found to be within a certain predetermined tolerance) is taken to be the actual measured angular displacement of the upper structure relative to its initial angular position. When a failure of one or more angle sensors is detected, this may be signaled to the operator via the output interface (e.g., via one or more visual effects on the dashboard 42 or an audible alert). Alternatively or in addition, the processor 64 may cause issuance of a signal that will alert the operator of the tracked vehicle 10 that a directionality switchover and/or smart alignment is/are not available to be requested. This can be done by modulating display of the pictogram(s) on the dashboard 42 that may ordinarily be illuminated to signal that a directionality switchover or smart alignment are available to be requested.

In this case, "modulating" may signify causing a pictogram to flash or be in a different color or be accompanied by an additional symbol (e.g., warning sign), for example.

It should further be appreciated that rotation of the upper structure relative to the lower structure requires an exertion of force by the motor 100, and that this force may not be equal over the range of relative angles between the upper and lower structures. This is particularly true in the case where the tracked vehicle is on a slope, as the motor needs to in some cases overcome the force of gravity and in other cases hold back the force of gravity. Since the energy required to overcome or withhold the force of gravity may stress the motor 100, and since the stress caused increases with the speed of rotation of the upper and lower structures together with the degree of incline, it is within the scope of the present invention to limit the speed of rotation as a result of the slope of the tracked vehicle, as measured by the inclinometer 206.

Moreover, the limit on the speed of rotation of the upper structure relative to the lower structure may be governed by various other parameters, such as the maximum or measured load of the work implement 20 and/or the relative dimensions of the work implement 20 (e.g., the maximum distance from a part of the work implement 20 to the axis about which relative rotation of the upper and lower structures occurs). In order to determine a measured load, a load sensor (e.g., scale, not shown) may be incorporated into the work implement or may be separately added to the upper or lower structure of the tracked vehicle, with a reading that is provided to the ECU 60.

Thus, it is possible to devise a set of rules that define rotation limit surface, which is a multivariate curve indicating how the speed of rotation of the upper structure relative to the lower structure (angular displacement over time) is limited by these various parameters, such as angle of inclination $\varphi$ (see FIG. 1B) and the rotation angle $\theta$ (see also FIG. 3).

One can envision the situation where the work implement 20 is a dump box, in which case when the angle of inclination $\varphi$ is high, then it is only at low angles of rotation $\theta$ that a somewhat higher speed of rotation is allowed, and the same applies for high angles of inclination and high angles of rotation. This arises from the fact that stability is present only when the dump box is "hanging" (in the sense of gravity). This means that despite the operator's continuing exertion of force on a control input (e.g., joystick, etc.) to rotate the upper structure 32 relative to the lower structure 26, the processor 64 will impose a limit on the angular velocity of the dump box 20 as the upper structure 32 rotates about the lower structure 26, to avoid destabilizing the tracked vehicle 10 as the dump box swings downwards.

Those skilled in the art will appreciate that the processor 64 may implement additional routines. For example, the processor 64 may implement a routine whereby operator inputs entered via the work implement control center 48 may be ignored under certain low temperature conditions in order to protect the slew bearing. To this end the thermometer 208 may be placed in the hydrostatic oil circuit of the vertical channel/slew bearing 16 that allows the upper structure to rotate relative to the lower structure. The output of the thermometer is sent to the ECU. The processor 64 then detects the temperature measured by the thermometer and if it is below a certain threshold (e.g., −18 degrees C. or −20 degrees C., for example), then the motor is locked and prevented from turning the upper structure 32 relative to the lower structure 26. When the temperature rises above the threshold, the motor may then be re-enabled.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A process for execution by a processor of an electronic control unit, comprising:
   detecting an operator command to align an upper structure of a tracked vehicle relative to a lower structure of the tracked vehicle; and
   in response to detection of the operator command, applying controlled rotation of the upper structure relative to the lower structure about an axis to align the upper structure relative to the lower structure at a predetermined relative angle;
   wherein applying controlled rotation of the upper structure relative to the lower structure about the axis to align the upper structure relative to the lower structure at the predetermined relative angle comprises limiting angular displacement of the upper structure relative to the lower structure about the axis in accordance with an angular displacement limit curve.

2. The process defined in claim 1, wherein the angular displacement limit curve indicates a maximum rate of angular displacement as a function of angular distance relative to the predetermined relative angle.

3. The process defined in claim 1, further comprising consulting a memory to obtain the angular displacement limit curve.

4. The process defined in claim 1, further comprising ceasing to limit said angular displacement in response to the operator command no longer being detected.

5. The process defined in claim 1, wherein the command is a first operator command, the process further comprising detecting a second operator command to rotate the upper structure relative to the lower structure about the axis, further comprising interrupting rotation of the upper structure relative to the lower structure about the axis in response to the second operator command no longer being detected.

6. The process defined in claim 1, wherein in response to the upper structure having been aligned relative to the lower structure at the predetermined relative angle, signaling that alignment has been achieved.

7. The process defined in claim 6, further comprising causing rotation of the upper structure to stop when alignment has been achieved.

8. The process defined in claim 6, further comprising being non-responsive to further detection of the operator command during said signaling.

9. The process defined in claim 6, further comprising being non-responsive to further detection of the operator command for a predetermined period of time after said signaling.

10. The process defined in claim 9, wherein the operator command is a first operator command, the process further comprising detecting a second operator command to rotate the upper structure relative to the lower structure about the axis, and wherein the period of time expires once the second operator command has been applied persistently for a second predetermined period of time following alignment.

11. The process defined in claim 6, wherein signaling that alignment has been achieved comprises temporarily stopping rotation of the upper structure when alignment has been achieved.

12. The process defined in claim 6, wherein signaling that alignment has been achieved comprises issuing at least one of an audible alert and an optical alert to an operator of the tracked vehicle when alignment has been achieved.

13. The process defined in claim 1, wherein applying controlled rotation of the upper structure relative to the lower structure about the axis to align the upper structure relative to the lower structure at the predetermined relative angle comprises autonomously rotating the upper structure relative to the lower structure about the axis to align the upper structure relative to the lower structure at the predetermined relative angle.

14. The process defined in claim 1, wherein during at least part of said controlled rotation, the tracked vehicle is prevented from traveling in a forward or reverse direction.

15. The process defined in claim 1, the process further comprising detecting a current relative angle between the upper and lower structures, wherein the predetermined relative angle is selected to be either a first angle or a second angle, as a function of the current relative angle between the upper and lower structures.

16. A tracked vehicle comprising:
   a body comprising a lower structure and an upper structure rotatable relative to the lower structure about 360 degrees of an axis;
   a motor for rotating the upper structure relative to the lower structure;
   first and second track assemblies mounted on, respectively, opposite lateral sides of the body;
   an operator interface for allowing an operator of the tracked vehicle to enter operator commands;
   an electronic control unit configured for:
      detecting an operator command to align an upper structure of a tracked vehicle relative to a lower structure of the tracked vehicle; and
      in response to detection of the operator command, applying controlled rotation of the upper structure relative to the lower structure about an axis to align the upper structure relative to the lower structure at a predetermined relative angle;
      wherein applying controlled rotation of the upper structure relative to the lower structure about the axis to align the upper structure relative to the lower structure at the predetermined relative angle comprises limiting angular displacement of the upper structure relative to the lower structure about the axis in accordance with an angular displacement limit curve.

17. The tracked vehicle defined in claim 16, wherein the upper structure comprises an operator cabin and a work implement rotatable together around the axis.

18. The tracked vehicle defined in claim 16, wherein the operator interface comprises a joystick and a smart alignment input.

19. The tracked vehicle defined in claim 16, further comprising a sensor for detecting rotation of the upper structure relative to the lower structure about said axis, the electronic control unit being configured to control operation of the motor based on an output of the sensor.

* * * * *